(12) United States Patent
Yuyama et al.

(10) Patent No.: US 7,721,508 B2
(45) Date of Patent: May 25, 2010

(54) TABLET FILLING DEVICE

(75) Inventors: Shoji Yuyama, Osaka (JP); Naoki Koike, Osaka (JP)

(73) Assignee: Yuyama Mfg. Co., Ltd., Toyonaka-shi (JP)

( * ) Notice: Subject to any disclaimer, the term of this patent is extended or adjusted under 35 U.S.C. 154(b) by 187 days.

(21) Appl. No.: 11/817,083

(22) PCT Filed: Feb. 23, 2006

(86) PCT No.: PCT/JP2006/303234

§ 371 (c)(1),
(2), (4) Date: Aug. 24, 2007

(87) PCT Pub. No.: WO2006/090762

PCT Pub. Date: Aug. 31, 2006

(65) Prior Publication Data

US 2009/0050644 A1     Feb. 26, 2009

(30) Foreign Application Priority Data

Feb. 25, 2005   (JP)   ............................. 2005-052008

(51) Int. Cl.
*B65B 1/06* (2006.01)

(52) U.S. Cl. ........................... 53/249; 53/237; 141/104; 141/171

(58) Field of Classification Search .................... 53/237, 53/239, 247, 249, 250, 251; 414/751.1; 141/104, 83, 98, 106, 171, 174
See application file for complete search history.

(56) References Cited

U.S. PATENT DOCUMENTS 3,774,784 A * 11/1973 Glass .......................... 414/239
4,005,782 A * 2/1977 Crockett ..................... 414/591
4,546,901 A * 10/1985 Buttarazzi .................... 221/10
4,721,005 A * 1/1988 Yoshiji et al. ............ 74/490.04
5,102,283 A * 4/1992 Balzola Elorza ............ 414/404
5,466,109 A * 11/1995 Iizuka ........................ 414/283
6,006,946 A   12/1999 Williams et al.
6,036,812 A * 3/2000 Williams et al. ............ 156/277

(Continued)

FOREIGN PATENT DOCUMENTS

CN          2547695 Y       4/2003

(Continued)

*Primary Examiner*—Paul R Durand
(74) *Attorney, Agent, or Firm*—Oblon, Spivak, McClelland, Maier & Neustadt, L.L.P.

(57) ABSTRACT

A tablet filling device to convey a vial to a tablet cassette for receiving tablets easily and reliably. The tablet filling device includes: a detachable tablet feeding unit including a plurality of tablet feeders capable of discharging tablets one by one and arranged horizontally and vertically; and an arm unit that carries an empty vial, fills the vial with tablets discharged from a tablet feeder of the tablet feeding unit, and carries the vial filled with the tablets. The arm unit includes: a perpendicularly moving base movable horizontally and vertically along a horizontal rail and a vertical rail, respectively, the rails provided in directions in which the tablet feeders of the tablet feeding unit are arranged; an arm base on the perpendicularly moving base to be slidable in a horizontal direction perpendicular to the horizontal rail and horizontally rotatable; and an arm, on the arm base, capable of holding the vial.

17 Claims, 18 Drawing Sheets

U.S. PATENT DOCUMENTS

| | | | |
|---|---|---|---|
| 6,108,588 A * | 8/2000 | McGrady | 700/231 |
| 6,119,737 A * | 9/2000 | Yuyama et al. | 141/104 |
| 6,170,230 B1 * | 1/2001 | Chudy et al. | 53/168 |
| 6,264,419 B1 * | 7/2001 | Schinzel | 414/751.1 |
| 6,379,096 B1 * | 4/2002 | Beutler et al. | 414/281 |
| 6,485,285 B1 * | 11/2002 | Shiotani | 425/139 |
| 6,506,009 B1 * | 1/2003 | Nulman et al. | 414/217.1 |
| 6,570,734 B2 * | 5/2003 | Ostwald et al. | 360/92.1 |
| 6,899,511 B2 * | 5/2005 | Gurevich et al. | 414/749.1 |
| 7,228,198 B2 * | 6/2007 | Vollm et al. | 700/235 |
| 2001/0046437 A1 * | 11/2001 | Bramwell et al. | 414/796.7 |
| 2002/0027742 A1 * | 3/2002 | Ostwald et al. | 360/92 |
| 2002/0182035 A1 * | 12/2002 | Karlen | 414/143.2 |
| 2003/0194306 A1 * | 10/2003 | Coughlin et al. | 414/744.1 |
| 2004/0059463 A1 * | 3/2004 | Coughlin | 700/229 |

FOREIGN PATENT DOCUMENTS

| | | |
|---|---|---|
| EP | 0 999 129 B1 | 1/2004 |
| JP | 54 67184 | 5/1979 |
| JP | 61 171709 | 10/1986 |
| JP | 61-171709 | 10/1986 |
| JP | 2 255149 | 10/1990 |
| JP | 3 40189 | 2/1991 |
| JP | 11 70901 | 3/1999 |
| JP | 2002 308444 | 10/2002 |
| JP | 2002-308444 | 10/2002 |
| JP | 2003 63594 | 3/2003 |
| JP | 2004 137051 | 5/2004 |
| WO | WO 2004/014288 A1 | 2/2004 |
| WO | WO 2004/014734 A1 | 2/2004 |

* cited by examiner

FIG. 13
(A)
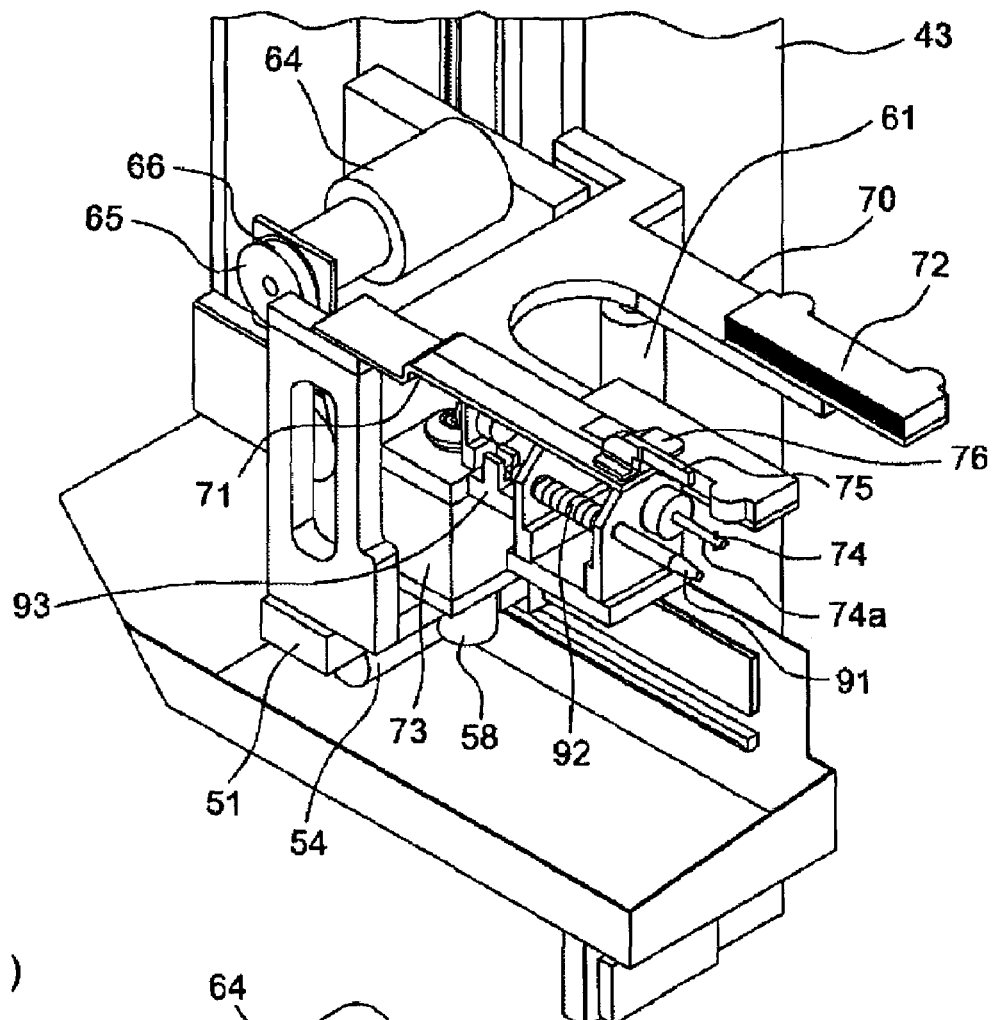
(B)
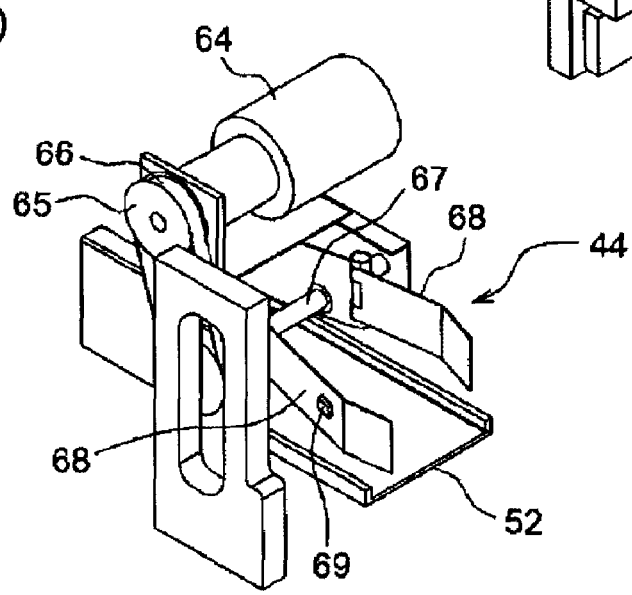

TABLET FILLING DEVICE

TECHNICAL FIELD

The present invention relates to a tablet filling device for filling a vial with tablets.

BACKGROUND ART

As disclosed in Patent Document 1, a conventional tablet filling device is composed of a tablet supply portion having a plurality of motor bases for attachment of tablet cassettes containing classified tablets, a tablet filling portion for filling vials with tablets, and a tablet container supply portion for supplying vials to the filling portion. The tablet supply portion rotates a rotor in each tablet supply container by a container driving motor built in each motor base to count and discharge a requisite amount of tablets, and the discharged tablets are conveyed to a filling position of the tablet filling portion by a hopper and a movable carrying container.

Patent Document 1: JP 11-70901 A

In the above conventional tablet filling device, it is necessary to provide all the respective motor bases with driving motors for discharging tablets and sensors for counting tablets. Further, when tablet clogging occurs in the rotor of a tablet cassette, overload of the driving motor is detected and an error is displayed, and the filling operation must be suspended until a restoring operation is performed by the operator.

DISCLOSURE OF THE INVENTION

Problems to be Solved by the Invention

In view of this, it is an object of the present invention to provide a tablet filling device which allows a vial conveyed to a tablet cassette for receiving tablets easily and reliably. Another object of the present invention is to provide a tablet filling device which is capable of resolving tablet clogging with a simple construction.

Means for Solving the Problems

In order to solve the above-mentioned problems, according to a first means, there is provided a tablet filling device including: a detachable tablet feeding unit in which a plurality of tablet feeders capable of discharging tablets one by one are arranged horizontally and vertically; and an arm unit which carries an empty vial, fills the vial with tablets discharged from a tablet feeder of the tablet feeding unit, and carries the vial filled with the tablets. In the tablet filling device, the arm unit includes: a perpendicularly moving base that is movable horizontally and vertically along a horizontal rail and a vertical rail, respectively, the rails being provided in directions in which the tablet feeders of the tablet feeding unit are arranged; an arm base provided on the perpendicularly moving base so as to be slidable in a horizontal direction perpendicular to the horizontal rail and horizontally rotatable; and an arm provided on the arm base so as to be capable of holding the vial.

In the first means, the tablet feeder of the tablet feeding unit may be, as in the prior art, composed of a tablet cassette and a motor base, with the rotor of the tablet cassette being driven by a driving motor of the motor base, or may be of a type which has no motor base, with the rotor of the tablet cassette being driven by a driving motor of the arm unit. Further, the tablet feeders of the tablet feeding unit may be arranged on one side with respect to the horizontal moving direction of the arm unit, or on both sides thereof. The arm unit is arranged on the tablet discharging side of the tablet feeders of the tablet feeding unit. The arm adopted may be of a type which grasps the outer periphery of the vial from the outside, of a type holding the bottom of the vial, of a type supporting the flange portion of the vial, or of a type supporting the inner periphery of the vial from the inside.

According to a second means, in the tablet filling device, the perpendicularly moving base is provided on a vertical rail moving along a horizontal rail. Instead, the perpendicularly moving base may be provided on a horizontal rail moving along a vertical rail.

According to a third means, in the tablet filling device, the arm base is composed of a slide base slidable along a slide rail provided on the perpendicularly moving base, and a rotation base rotatable around a rotation shaft provided on the slide base. Instead, the arm base may be composed of a rotation base rotatable around a rotation shaft provided on the perpendicularly moving base, and a slide base slidable along a slide rail provided on the rotation base.

According to a fourth means, in the tablet filling device, the arm base is provided so as to be capable of inclining such that the opening of the vial held by the arm is oriented in a tablet discharging direction in which tablets are discharged from the tablet feeder. In the case in which tablets slide down on an inclined surface, the tablet discharging direction refers to the direction extending along the inclined surface; in the case in which tablets fall along a parabola by gravitational force, it refers to the falling direction.

According to a fifth means, in the tablet filling device, each of the tablet feeders includes: a container for containing tablets; a rotor for discharging the tablets one by one; a rotor gear fixed to a shaft of the rotor; a worm wheel that is in mesh with the rotor gear; a worm that is in mesh with the worm wheel; and a portion to be connected that is formed at an axial end of the worm. The arm unit has: a drive shaft having at its forward end a connecting portion that is connected to the portion to be connected of the worm to transmit power; and a drive motor for driving the drive shaft.

According to a sixth means, in the tablet filling device, the portion to be connected of the tablet feeder includes: a hole formed so as to axially extend from the axial end of the worm; and a spiral groove extending axially around the hole. The connecting portion of the arm unit includes: a shaft to be fitted into the hole of the portion to be connected; and a protrusion extending perpendicularly from the shaft to be fitted into the groove of the portion to be connected.

According to a seventh means, in the tablet filling device, the container of the tablet feeder is provided with a portion to be engaged, and an engagement portion that is to be engaged with the portion to be engaged of the tablet feeder is provided in a vicinity of the connecting portion of the drive shaft.

According to an eighth means, in the tablet filling device, the tablet feeder has: a container containing tablets; a rotor for discharging the tablets one by one; and a transmission gear for transmitting power to the rotor. The arm unit has: a drive gear that is in mesh with the transmission gear; and a drive motor for rotating the drive gear.

According to a ninth means, in the tablet filling device, the arm base is rotated, when the drive motor is overloaded, for temporarily separating the drive gear from the transmission gear, and then the drive gear is brought into mesh with the transmission gear again for imparting an impact to the tablet feeder before re-starting the drive motor.

According to a tenth means, in the tablet filling device, the arm base is caused to slide, when the drive motor is overloaded, for temporarily separating the drive gear from the transmission gear, and then the drive gear is brought into mesh with the transmission gear again for imparting an impact to the tablet feeder before re-starting the drive motor.

According to an eleventh means, in the tablet filling device, the arm unit has a counting means for counting tablets discharged from the tablet feeders.

According to a twelfth means, in the tablet filling device, the sensor is arranged above and on either side of an opening of the vial being held by the arm.

According to a thirteenth means, in the tablet filling device, the arm unit has a vibration imparting means for vibrating the arm.

According to a fourteenth means, in the tablet filling device, the vibration imparting means is a piezoelectric element. It is desirable for the piezoelectric element to be provided so as to be situated between the arm and the vial grasped by the arm.

According to a fifteenth means, in the tablet filling device, a cover is provided at a discharge port of each tablet feeder through which tablets are discharged. It is desirable for this cover to be rotatably mounted to a portion above the discharge port, with the lower end of the cover moving away from the discharge port to open the same. Further, it is also possible for the cover to close the discharge port by its own weight, or by an urging means such as a spring. Further, the cover may be directly mounted to the tablet feeder, or an opening communicating the discharge port of the tablet feeder may be provided in the wall to which the tablet feeder is mounted, with the cover being mounted at this opening.

According to a sixteenth means, in the tablet filling device, a protrusion is provided on the arm base, and when the arm base slides to approach the tablet feeder, the protrusion presses the cover at the discharge port to open the cover. In this case, it is desirable to provide a lever for opening the cover, with the lever pressing the protrusion.

EFFECTS OF THE INVENTION

According to the invention using the first through third means, a vial is grasped by the arm of the arm unit, and is carried to the tablet feeder accommodating tablets with which the vial is to be filled. Therefore, it is possible for the vial to directly receive tablets discharged from the tablet feeder. Thus, there is no need to convey the tablets from the tablet feeder to the filling position, and there is no fear of tablets being lost in the course of conveyance, making it possible to simplify the construction of the tablet filling device and to perform filling with tablets reliably.

According to the invention using the fourth means, the vial is inclined, so it is possible to reliably receive the tablets discharged from the tablet feeder.

According to the invention using the fifth means, the worm is threadedly engaged with the rotor gear of the tablet feeder through the intermediation of the worm wheel, so there is no fear of the rotor idling when detached from the tablet feeder and thereafter. Thus, there is no fear of any tablet that has been caught at the discharge port of the tablet feeder being detached through slight rotation of the rotor.

Further, since the arm unit is provided with a drive shaft and a drive motor, it is possible to drive all the tablet feeders with a single motor, so there is no need to provide individual drive motors for driving each tablet feeder. Thus, the construction of the tablet filling device is simplified.

According to the invention using the sixth means, when the slide base of the arm unit slides to approach the tablet feeder, the connecting portion of the drive shaft of the arm unit is connected to the portion to be connected of the worm of the tablet feeder solely by driving the drive shaft of the arm unit. As a result, the power of the drive motor is reliably transmitted to the rotor, and the tablet feeder of the arm unit involves no defective connection.

According to the invention using the seventh means, when the slide base of the arm unit slides to approach the tablet feeder, the engagement portion of the arm unit is engaged with the portion to be engaged of the tablet feeder. The connecting portion of the drive shaft of the arm unit and the portion to be connected of the worm of the tablet feeder are easily connected together, so it is possible to prevent defective connection more reliably.

According to the invention using the eighth means, solely by causing the slide base of the arm unit to slide to approach the tablet feeder, the drive gear of the arm unit is threadedly engaged with the transmission gear of the tablet feeder. As a result, the drive gear of the arm unit and the transmission gear of the tablet feeder can be easily connected together, thus involving no defective connection. Further, since the arm unit is provided with a drive gear and a drive motor, it is possible to drive all the tablet feeders with a single motor, and there is no need to provide individual motors for driving each tablet feeder. Thus, the construction of the tablet filling device is simplified.

According to the invention using the ninth and tenth means, when the rotor undergoes tablet clogging and the drive motor is under overload, the drive gear is caused to collide with the transmission gear through rotation or sliding of the arm base, so it is possible to reliably resolve the tablet clogging through the impact of the collision.

According to the invention using the eleventh and twelfth means, the arm unit is provided with a sensor for counting tablets. As a result, it is possible to count, with a single sensor, the number of tablets with which the vial is filled, and there is no need to provide sensors for counting tablets at each of the tablet discharge positions of all the table feeding containers. Thus, the construction of the tablet filling device is simplified.

According to the invention using the thirteenth and fourteenth means, the arm is provided with a vibration imparting means, as a result, by vibrating the arm during tablet discharging operation, the vial is filled with tablets. It is possible to prevent overflowing of tablets from the vial due to an increase in bulk or unevenness in tablet filling caused by rough filling, making it possible to reliably fill the vial with the requisite amount of tablets.

According to the invention using the fifteenth means, a cover is provided at the discharge port of the tablet feeder, so it is possible to prevent intrusion of dust through the discharge port. Further, when tablets are discharged through the discharge port, it is possible to prevent the tablets from being off the vial and scattered.

According to the invention using the sixteenth means, when the arm base slides and approaches the tablet feeder, the protrusion of the arm base presses the cover of the discharge port of the tablet feeder to open the same. As a result, there is no need to provide any special drive means for opening the cover, thereby achieving simplification in construction.

BEST MODE FOR CARRYING OUT THE INVENTION

In the following, an embodiment of the present invention will be described with reference to the accompanying drawings.

FIGS. 1 through 4 show a tablet filling device according to this embodiment. This tablet filling device is equipped with a container supply unit 1, a labeling unit 2, a tablet feeding unit 3, a capping unit 4, a carrying member 5, and en extraction unit 6.

The container supply unit 1 is equipped with a plurality of buckets 8 provided side by side in the lower portion of the front surface of a device main body 7, with the buckets 8 accommodating tablet containers (vials in this example) of different sizes. In order to allow replenishment with vials 9, the buckets 8 can be opened on the front side of the device main body 7. The vials 9 accommodated in each bucket 8 are raised by a well-known lifter, and are conveyed to a first carrying member 34.

The labeling unit 2 serves to affix labels to the outer peripheral surfaces of the vials 9 conveyed, and may formed of a well-known unit (see, for example, U.S. Pat. No. 5,798,020).

The tablet feeding units 3 are arranged on both sides of the device main body 7; as shown in FIG. 5, they are mounted to the outer surfaces of support panels 10 provided on both sides of the device main body such that a plurality of tablet feeders 11 are detachable. The tablet feeders 11 are aligned in the horizontal direction, are arranged in a number stages in the vertical direction. The support panels 10 have tablet outlets 10b at positions corresponding to the tablet feeders 11. Each tablet outlet 10b has an inclined surface. The support panels 10 further have sensor holes 72' above and on both sides of each tablet outlet allowing entering of a sensor 72 described below, and drive shaft holes 74', protrusion holes 75', and detection rod holes 91' through which drive shafts 74, protrusions 75, and detection rod 91 are inserted, respectively. On the inner surfaces of the support panels 10, there are provided covers 10b closing the tablet outlets 10b. The upper ends of the covers 10b are rotatably mounted above the tablet outlets 10b; they are adapted to close the tablet outlets 10b by their own weight, and their lower ends are opened when levers 10c provided at the upper ends of the covers 10b are pushed. The tablet feeders 11 accommodate tablets of different kinds.

As shown in FIG. 7, each tablet feeder 11 includes a tablet cassette 12 accommodating a rotor 13. When the rotor 13 is rotated, the tablets accommodated are dispensed one by one.

The tablet cassette 12 includes a cassette main body 14 equipped with a cover member 15 that can be opened and closed.

The cassette main body 14 is composed of a cylindrical rotor accommodating portion 16, and a tablet accommodating portion 17 in the form of a rectangular tube situated on top of the same. In the tablet accommodating portion 17, a space allowing to accommodate tablets is defined by the upper surface (conical surface 13a) and the side wall of the rotor 13.

As shown in FIGS. 8 and 9, a portion on the back side of the rotor accommodating portion 16 is formed by a detachably provided first replacement piece 18. A tablet discharge port 19 and a slit 20 are formed in the first replacement piece 18. A partition member 21 is fixed in position in the vicinity of the slit 20, and a brush portion 21a thereof protrudes into the rotor accommodating portion 16 through the slit 20. By forming the tablet discharge port 19 and the slit 20 by the first replacement piece 18, differences in the shape of the rotor 13, etc. can be dealt with through replacement of the first replacement piece 18 only, with the remaining portions being of the common construction.

Further, at the center of the bottom surface of the rotor accommodating portion 16, there is formed a through-hole (not shown), and an intermediate gear 22 is rotatably mounted in the vicinity thereof. The intermediate gear 22 is formed by axially integrating a first gear 22a and a second gear (worm wheel) 22b.

Further, mounted to the bottom surface of the rotor accommodating portion 16 is a worm 23 in mesh with the second gear 22b of the intermediate gear 22. That is, support walls 17a and 17b protrude at a predetermined interval from the bottom surface of the rotor accommodating portion 16 to rotatably support the worm 23. A stopper 24 is provided at one end of the worm 23, and a spring 26 is fitted onto a shaft portion 25 protruding therefrom. The spring 26 is situated between the stopper 24 and the support wall 17b, and urges the worm 23 toward the support wall 17a situated on the opposite side. As a result, positioning is effected on the worm 23, with the tooth surface thereof being in press contact with the tooth surface of the second gear 22b of the intermediate gear 22. Further, a locking/receiving portion 27 is formed at the forward end of the shaft portion 25. The locking/receiving portion 27 is composed of a hole 28 formed in the axial direction from the forward end, two guide grooves 29a spirally formed between the hole 27 and the outer peripheral wall, and a pin holding portion 29b provided at the terminal end of the guide grooves 28a and further cut away in the circumferential direction.

As shown in FIGS. 7 and 9, the tablet accommodating portion 17 is formed by a second replacement piece 30 the upper portion of the back surface of which is detachably provided. The second replacement piece 30 is equipped with an escape recess 31, and bearing portions 32 are formed on both sides thereof. The reason for providing the second replacement piece 30 with the escape recess 31 is that, in molding, it is rather difficult to form an inwardly swollen inclined portion for forming the escape recess 31 in the tablet cassette 12. In view of this, by attaching afterward the second replacement piece 30 molded by a separate process, an increase in the mold cost, etc. is suppressed.

The cover member 15 is formed as a rectangular plate, and is provided with a shaft portion 15a rotatably supported by the bearing portions 32. On the inner side of the shaft portion 25, there is formed a cutout portion 15b in correspondence with the escape recess 31, and interference with the discharge path of the tablet cassette 12 arranged upwardly adjacent thereto is avoided by virtue of the escape recess 31 and the cutout portion 15b. As a result, it is possible to arrange the tablet cassettes 12 at high density in the vertical direction.

The rotor 13 is of a columnar configuration, and has an upper surface formed as a conical surface 13a whose central portion protrudes upwardly. An axially extending guide groove (not shown) is formed in the outer peripheral surface of the rotor 13, and tablets are accommodated in an aligned state therein, one on the upper side and one on the lower side. The tablets in the guide groove is vertically separated by the brush portion 21a of the partition member 21, and solely the one tablet on the lower side is dropped through the tablet discharge port 19. At the center of the lower surface of the rotor 13, there is integrally provided a rotation shaft, which extends through the through-hole formed in the bottom surface of the rotor accommodating portion 16, with a rotor gear 33 being fixed to the protruding portion thereof. The rotor gear 33 is in mesh with the first gear 22a of the intermediate gear 22. As a result, when the worm 23 is rotated, the rotor gear 33 and the rotor 13 are rotated through the intermediate gear 22.

Although not shown in detail, in the capping unit 4, a cap supplied from the cap supply portion through a chute is supported by a support arm, and an upper opening of a vial 9 downwardly carried by a third carrying member 41 described below is closed, the cap being rotated while pressed by the cap attachment portion to thereby effect capping.

The carrying member 5 is formed by first, second, third, and fourth carrying members 34, 37, 41, and 52, respectively.

As shown in FIG. 3, each first carrying member 34 is composed of rollers 34a arranged at a predetermined interval and two round belts 34b stretched there between at a predetermined interval, and is arranged behind a lifter arranged on the back side of each bucket 8. The vial 9 to be extracted by the lifter is placed on the round belts 34b. By rotating the rollers 34a by a motor (not shown), the vial 9 placed on the round belts 34b is carried, and further, can be transferred to the extraction unit 6 side by a carrying belt conveyor 35. At the destination of the carrying by the first carrying member 34, there is arranged a slidable container support portion 36 for vertically supporting the vial 9 according to its size such that its opening is directed upwardly. As shown in FIG. 4(B), the container support portion 36 is composed of support members 36a protruding at predetermined intervals, and the distance between the adjacent support members 36a is set at a value allowing supporting of the flange portions of vials 9 of different sizes.

As shown in FIG. 3, the second carrying member 37 is equipped with a pair of holding members 38 for holding and upwardly moving the vial 9 supported by the container support portion 36. The holding members 38 ascend and descend along a vertical rail 38a, and are rotatable around a support shaft. The upper end portions of the holding members 38 are urged by a spring (not shown) so that the lower end portions thereof may be separated from each other. Further, a rectangular opening/closing frame member 39 is provided around the lower ends of the holding members 38. The opening/closing frame member 39 is movable between a closed position at which the lower ends of the holding members 38 are brought close to each other against the urging force of the spring 26, and an open position at which they are held in press contact with the inner surface of the vial 9 to hold the same. The opening/closing frame member 39 is moved to the closed position by raising the holding members 38 and causing them to abut a stop portion 40 arranged above it.

In the second carrying member 37, the holding members 38 are lowered with their lower ends brought close to each other by the opening/closing frame member 39; at the point in time when the holding members 38 enter the vial 9, the opening/closing frame member 39 abut the upper portion of the vial 9. As a result, when the holding members 38 further descend, the guide by the opening/closing frame member 39 is canceled, and the holding members 38 are spread apart due to the urging force of the spring to thereby hold the vial 9. When the holding members 38 ascend in the state in which they hold the vial 9, the opening/closing frame member 39 abuts the stop portion 40, and the holding members 38 are forcibly placed in the closed state, with the holding state for the vial 9 being canceled.

As shown in FIG. 3 and, in more detail in FIGS. 10 through 12, the third carrying member 41 is composed of horizontal rails 42a and 42b, a vertical rail 43, and an arm unit 44.

The horizontal rails 42a and 42b are provided in upper and lower portions between the two tablet feeding units 3, and extend in the direction in which the tablet feeders 11 are arranged horizontally. As shown in FIG. 11, the upper horizontal rail 42a is provided with a drive belt 46 to be driven by a drive motor 45. The vertical rail 43 is mounted such that upper and lower ends thereof can respectively slide on the upper horizontal rail 42a and the lower horizontal rail 42b and can be caused to slide along the horizontal rails 42a and 42b by the drive belt 46 of the horizontal rail 42a. The vertical rail 43 is provided with a drive belt 48 to be driven by a drive motor 47.

The arm unit 44 is composed of a perpendicularly moving base 49, a slide base 50, a rotation base 51, and an inclining base 52. The perpendicularly moving base 49 is slidably mounted to the vertical rail 43, and is vertically slidable along the vertical rail 43 by a drive belt 48 for the vertical rail 43. The perpendicularly moving base 49 has a slide rail 53 extending horizontally in a direction perpendicular to the horizontal rails 42a and 42b, that is, in a direction perpendicular to the support panel 10 of the tablet feeding unit 3. The slide base 50 is slidably mounted to the slide rail 53 of the perpendicularly moving base 49, and is movable so as to advance and retreat with respect to the tablet feeder 11 of the tablet feeding unit 3 by a drive motor 54 via a pinion 55 and a rack 56. The rotation base 51 is provided on the slide base 50 so as to be rotatable around a vertical shaft 57, and is adapted to be rotated by 180 degrees by a drive motor 58 provided on the slide base 50 via gears 59a and 59b. The inclining base 52 is provided on the rotation base 51 so as to be rotatable around a horizontal shaft 60. By rotating the horizontal shaft 60 by a drive motor 61 provided to the rotation base 51 via a worm 62 and a worm wheel 63, the inclining base is inclined, as shown in FIG. 14, downwardly by a predetermined angle from the horizontal position, inclining the vial 9 along the inclined surface of the tablet outlet 10a, whereby the tablets sliding down on the inclined surface of the tablet outlet 10a are reliably received. When the tablets fall from the tablet outlet 10a by gravitational force along a parabola, the inclining base 51 is inclined such that the opening of the vial 9 is oriented in the falling direction.

As shown in FIG. 13(B), the inclining base 52 is provided with a pair of arms 68 that are opened and closed by driving a drive motor 64 via a roller 65, a belt 66, and a ball screw 67, making it possible to grasp the vial 9 by the arms 68. The arms 68 are provided with piezoelectric elements 69 adapted to be oscillated by applied fluctuating voltage. While the vial 9 is being held by the arms 68, the piezoelectric elements 69 are oscillated by the applied voltage, thereby bringing the tablets filling the vial 9 into a high density state involving no clearances.

As shown in FIG. 13(A), above the arms 68, the rotation base 51 is equipped with a U-shaped sensor arm 70 and a drive arm 71. A count sensor 72 is provided at the forward end of the sensor arm 70. The count sensor 72 is composed of a light emitting element and a light receiving element. An infrared laser beam is intercepted by passing tablets, whereby the tablets discharged from the tablet feeder 11 and supplied to the vial 9 are detected. Then, based on a detection signal from the count sensor 72, the number of tablets supplied to the vial 9 is counted by a control device 80 described below. Further, the drive arm 71 is provided with a drive shaft 74 capable of normal and reverse rotation through driving of a drive motor 73. From the forward end of the drive shaft 74, there protrude lock pins 74a to be engaged with and detached from the locking/receiving portion 27 of the worm 23 provided in the tablet feeder 11. Further, from the drive arm 71, there protrude a protrusion 75 to be engaged with the engagement portion 16a formed in the back surface of the rotor accommodating portion 16 of the tablet cassette 12, and a pressing member 76 to push open the cover 10b closing the tablet outlet 10a of the support panel 10 of the tablet cassette 12 by depressing a lever 10c. Further, a detection rod 91 for detecting that the arm unit 44 is not at the correct position is provided in parallel to the drive shaft 74. When the arm unit 44 advances toward the correct position, the detection rod 91 is engaged with a detection hole 91' of the support panel 10. However, when the detection rod 91 is not engaged with the detection hole 91' of the support panel 10 but collides with the support panel 10, the detection rod 91 retreats against the urging force of a spring 92, and its rear end is detected by a sensor 93.

As shown in FIG. 3, the fourth carrying member 77 has an arm 77a for grasping the vial 9, and is capable of advancing, retreating, and rotating substantially by 360 degrees. As a result, the fourth carrying member 52 moves to the capping unit 4 while holding the vial 9 delivered from the third carrying member 41, carrying the vial 9, to which the cap has been attached by the capping unit 4, to the extraction unit 6.

As shown in FIGS. 1 and 2, the extraction unit 6 is equipped with a plurality of extraction ports 78, has a display 79 at a center thereof, and contains the control device 80 in the lower portion thereof.

As shown in FIG. 4(A), at the delivery position between the third carrying member 41 and the fourth carrying member 52, there is provided a container holding member 83 formed of a support plate 81 equipped with a pair of guide arms 82. A container holding member 83 of a similar construction is provided at a standby position in the vicinity of the delivery position.

Based on prescription data (as prepared by the doctor, and other data regarding the patient) input from a host computer or the like, the control device 80 drive-controls the container supply unit 1, the labeling unit 2, the tablet feeding unit 3, the capping unit 4, the carrying member 5, and the extraction unit 6.

Next, the operation of the tablet filling device, constructed as described above, will be illustrated with reference to the flowcharts of FIGS. 15 through 17.

When prescription data is input from the host computer or the like (Step S1), a suitable vial 9 is selected based on the prescription data and taking into consideration the size and amount of the corresponding tablets (Step S2). Then, the selected vial 9 is carried from the bucket 8 (Step S3). That is, the lifter is driven to carry the vial 9 to the first carrying member 34.

In the first carrying member 34, the vial 9 placed in a horizontal position on the round belts 34b by the lifter is carried toward the extraction unit 6 (Step S4). Then, the container support portion 36 is slid and set ready so that the carried vial 9 can be received (Step S5). As a result, the vial 9 is supported in a vertical position at the container support portion 36 so as to be open on the upper side. Subsequently, the container support portion 36 is slid, and a label with a predetermined print is affixed to the outer peripheral surface of the vial 9 by the labeling unit 2 (Step S6). Further, the second carrying member 37 is driven, and the vial 9 is raised while held by the holding members 38 (Step S7).

Here, the third carrying member 41 is driven, and the vial 9 raised by the second carrying member 37 is held (Step S8). At this time, in the second carrying member 37, the holding members 38 are moved upwards, and the holding state for the vial 9 is canceled by forcibly bringing the lower end sides of the holding members 38 close to each other by the guide frame member 68 (Step S9). The third carrying member 41 transfers the held vial 9 to the tablet feeder 11 containing the corresponding medicine based on the prescription data (Step S10). Then, the vial 9 is placed at a position where it is possible to collect tablets dropping from the tablet discharge port 19 of the tablet feeder 11 (Step S11).

Subsequently, the drive motor 54 is driven to cause the slide base 50 to advance (Step S12). As a result, the detection rod 91 advances to enter the detection hole 91' of the support panel 10. However, when the detection rod 91 is not engaged with the detection hole 91' of the support panel 10 but collides with the support panel 10, it is detected by the sensor 93. When it is determined from the detection signal of the sensor 93 that the arm unit 44 is not at the correct position, the arm unit 44 is caused to retreat to change its position, and advances again to be set at the correct position. Further, the press member 76 advances to pushes the lever 10c to open the cover 10b, and the protrusion 75 is engaged with the engagement portion 16a. At this time, the drive shaft 74 also advances, and the lock pins 74a thereof are locked to the locking/receiving portion 27 formed on the worm 23 of the tablet feeder 11. The guide groove 28 is formed in a spiral configuration, so the lock pins 74a smoothly enter the guide groove 28, and undergo positioning at the locking/receiving portion 27. Here, the drive shaft 74 is rotated, and the rotor 13 is rotated via the worm 23, the intermediate gear 22, and the rotor gear 33 (Step S13). As a result, the tablet situated on the lower side, which is separated in the groove of the rotor 13 by the brush portion 21a of the partition member 21, drops through the tablet discharge port 19. The dropping tablet is detected by the count sensor 72 (Step S14), and, based on the detection signal thereof, a judgment is made as to whether the vial 9 has been filled with a predetermined number of tablets or not (Step S17). However, when no detection signal is output from the count sensor 72 although the filling is halfway through (Step S15), it is determined that there is no more tablet in the tablet cassette 12 (deficiency), and the vial 9 is temporarily carried to container holding member 83 at the standby position (Step S16). Then, the procedure returns to Step S1, and the above processing is continued on the next vial 9. As a result, even when tablet deficiency occurs halfway through the tablet filling operation, it is possible to continue filling operation on the next vial 9, and there is no fear of the operation being suspended. Thus, it is possible to perform an efficient processing.

It may occur, during the operation of filling the vial 9 with tablets from the tablet feeder 11, that the rotation of the rotor 13 stops due to clogging with a tablet, etc. In this case, a force is applied to the tablet as a result, for example, of being caught between the inner edge of the tablet discharge port 19 and the groove of the rotor 13. It should be noted, however, that the worm 23 is axially slidable while urged by the spring 26. Thus, the worm 23 moves before the tablet has suffered damage, mitigating the force applied to the tablet. Further, at this time, an excess current flows through the motor, and the stopping of the rotation of the rotor 13 is detected. Thus, based on this detection signal (Step S18), the slide base 50 is moved to cause the drive shaft 74 to retreat, whereby the worm 23 is moved against the urging force of the spring 26 (Step S19). As a result, the rotor gear 33 and the rotor 13 make reverse rotation via the intermediate gear 22 according to the displacement of the worm 23, thereby resolving the clogging with the tablet. Thus, it is possible to cause the rotor 13 to make normal rotation, and to resume the supply of tablets. However, in the case in which the stop state is maintained even when the rotor 13 is caused to make reverse rotation through movement of the worm 23 (Step S20), an error is reported to stop the motor (Step S21). When the stop state of the rotor 13 is maintained, the reverse rotation of the rotor 13 through movement of the worm 23 may be repeated a plurality of times.

At the delivery position, it is made sure that no vial 9 is on standby (Step S22). When no vial 9 is on standby at the delivery position, the present vial 9 is carried to the container holding member 83 at the delivery position (Step S23).

When the preceding vial 9 is already on standby at the delivery position, a vacant container holding member 83 is searched for from among the standby positions (Step S24), and the vial 9 is carried to the vacant container holding member 83 judged to be vacant (Step S25). In this case, coordinate data on the standby position is stored in the storage portion of the control device 80, so the size of the vial 9 conveyed and the kind of tablets to be accommodated in the vial 9 are stored in relation to the coordinate data (Step S26). As a result, when the capping at the capping unit 4 becomes possible, it is possible to carry the corresponding vial 9 to the capping unit 4 by the third carrying member 41 based on the stored data.

When the vial 9 is thus carried to the delivery position or the standby position, the fourth carrying member 77 is driven, and the vial 9 is carried to the capping unit 4 while held by the arms 77a (Step S27). Then, a cap is supplied via a chute (Step S28), and this cap is situated so as to cover the upper opening of the vial 9 carried (Step S29). Then, the cap attachment portion is driven to cap the vial 9 (Step S30). When the capping is completed (Step S31), the vial 9 held by the arms 77a is carried to an extraction port 78 by the fourth carrying member 77 (Step S32). At the extraction port 78, information on the vial 9 carried (e.g., the name of the tablets accommodated therein) is indicated through the display 79 (Step S33). Accordingly, the operator can ascertain at a glance the vial 9 carried in terms of the prescription data on the tablets accommodated therein.

FIG. 18 shows another embodiment of the tablet feeder 11 and the arm unit 44. Instead of the intermediate gear 22 composed of the first gear 22a and the second gear (worm wheel) 22b and the worm 23 of the above embodiment, the tablet feeder 11 is provided with a driven gear 84. On the other hand, the drive arm 71 of the arm unit 44 is provided with a support arm 86 rotatable around a support shaft 85. Mounted to the support arm 86 are a drive motor 87, a transmission gear 88 fixed to the output shaft of the drive motor, and a drive gear 89 in mesh with the transmission gear. The support arm 86 is urged by a spring 90 so as to cause the drive gear 89 to be brought into mesh with the driven gear 84.

In this embodiment, when the arm unit 44 is caused to slide toward the tablet feeder 11, the drive gear 89 is brought into mesh with the driven gear 84 of the tablet feeder 11. At this time, even if the driven gear 84 and the drive gear 89 are out of phase and their crests abut each other, since the drive gear 89 is supported by the support arm 86 urged by the spring 90, the drive gear 89 retreats, and the device suffers no damage. When, in this state, the drive motor 87 is driven, the drive gear 89 and the driven gear 84 are brought into mesh with each other, so rotation can be reliably transmitted. When the drive motor 87 is rotated in the direction indicated by the arrow, the rotor 13 of the tablet feeder 11 rotates, and tablets are discharged.

When, during the discharge of tablets, tablet clogging occurs in the rotor 13 of the tablet feeder 11, the drive motor 87 stops under overload. Here, while keeping the drive motor 87 at rest, the arm unit 44 is slightly rotated in the direction of the arrow r, whereby the drive gear 89 is temporarily separated from the driven gear 84 while slightly rotating the drive gear 89 in the reverse direction. In this way, by causing the driven gear 84 to make reverse rotation and slightly reverse-rotating the rotor 13, clogging generated in the rotor 13 is mostly resolved. And, by rotating the arm unit 44 in the direction of the arrow p to restore the arm unit 44 to the angle at which the arm unit 44 is squarely opposed to the tablet feeder 11, and by bringing the drive gear 89 into mesh with the driven gear 84 again, an impact is imparted to the tablet feeder 11. Due to this impact, any clogging that has not been resolved through reverse rotation of the driven gear 84 is resolved, and the drive motor 87 is started again to discharge tablets. Even this does not help resolve the tablet clogging, the drive motor 87 is under overload again, so the same operation is conducted once more. Only when the drive motor 87 is continuously under overload, an error is displayed, and the tablet filling device 1 is stopped.

In FIG. 18, instead of slightly rotating the arm unit 44 in the direction of the arrow r, the arm unit 44 may be caused to slide in the direction of the arrow x to separate the drive gear 89 from the driven gear 84, and, further, the arm unit 44 may be caused to slide in the direction of the arrow y to bring the drive gear 89 into mesh with the driven gear 84 again, thereby imparting an impact to the tablet feeder 11. It is also possible to resolve tablet clogging by this impact.

BRIEF DESCRIPTION OF THE DRAWINGS

FIG. 13 includes portion (a) showing a perspective view of the main portion of the third carrying member shown in FIG. 3, and portion (b) showing a perspective view of the container holding member with the arm sensor removed from portion (a).

Figure 1:
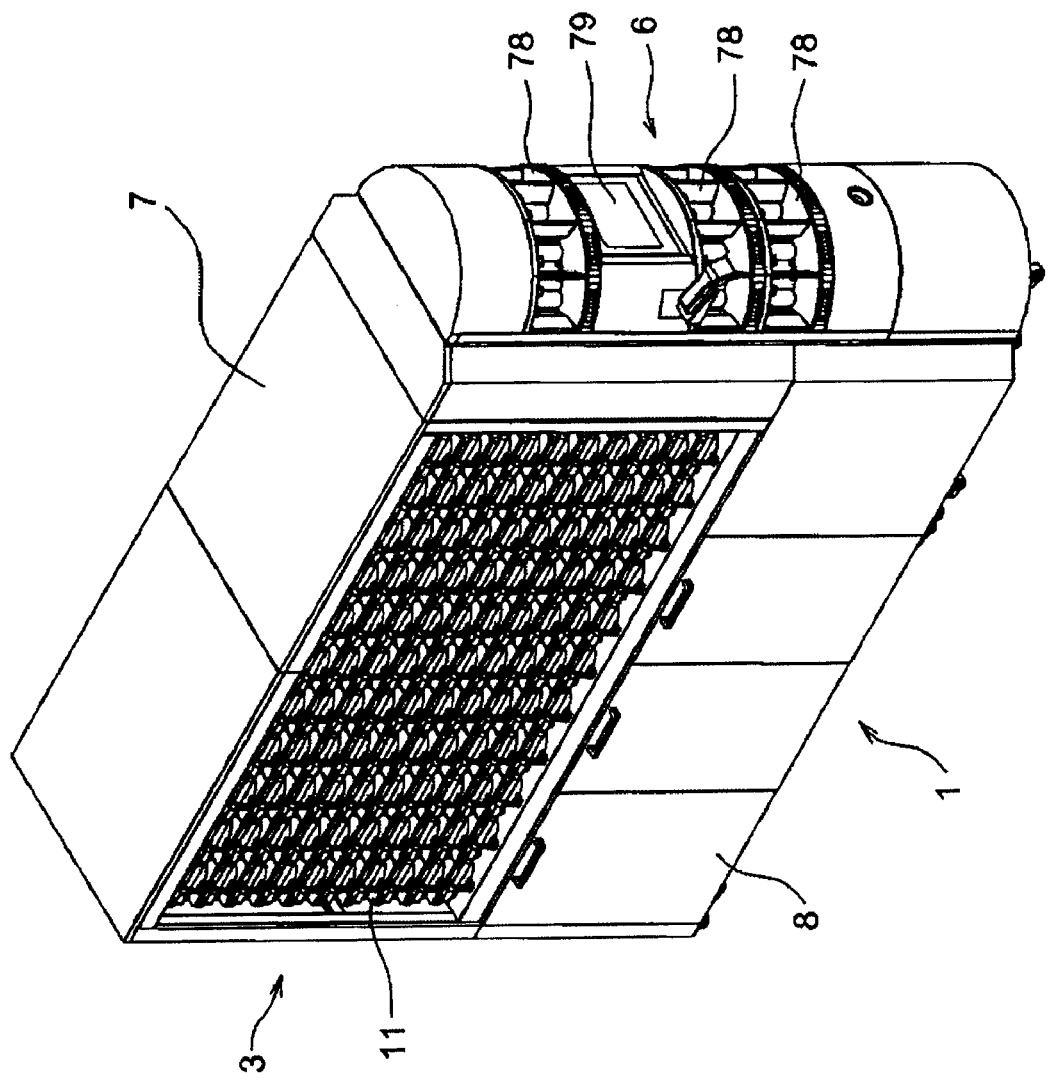
FIG. 1 is a perspective view of the tablet filling device of this embodiment.
Figure 2:
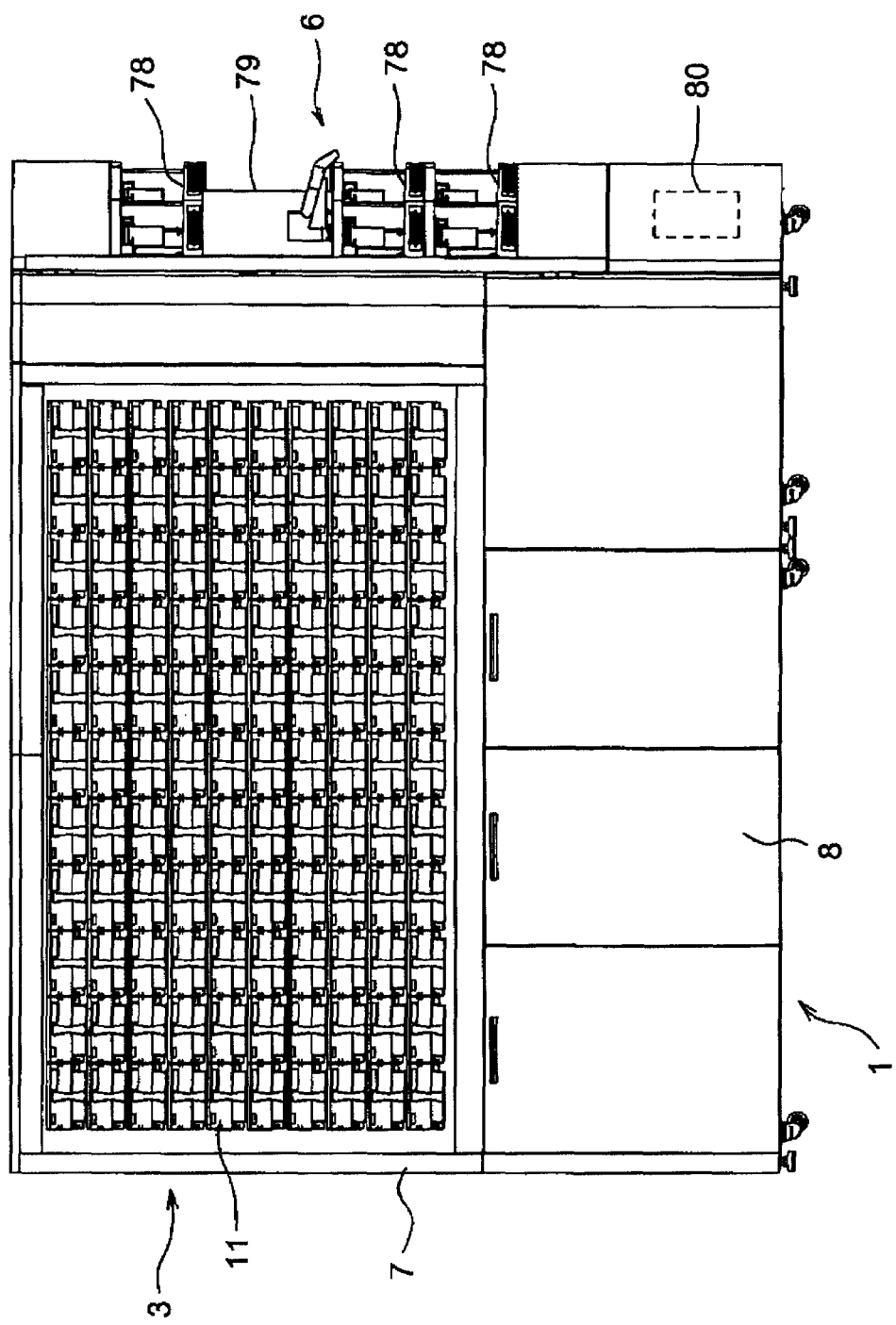
FIG. 2 is a front view of FIG. 1
Figure 3:
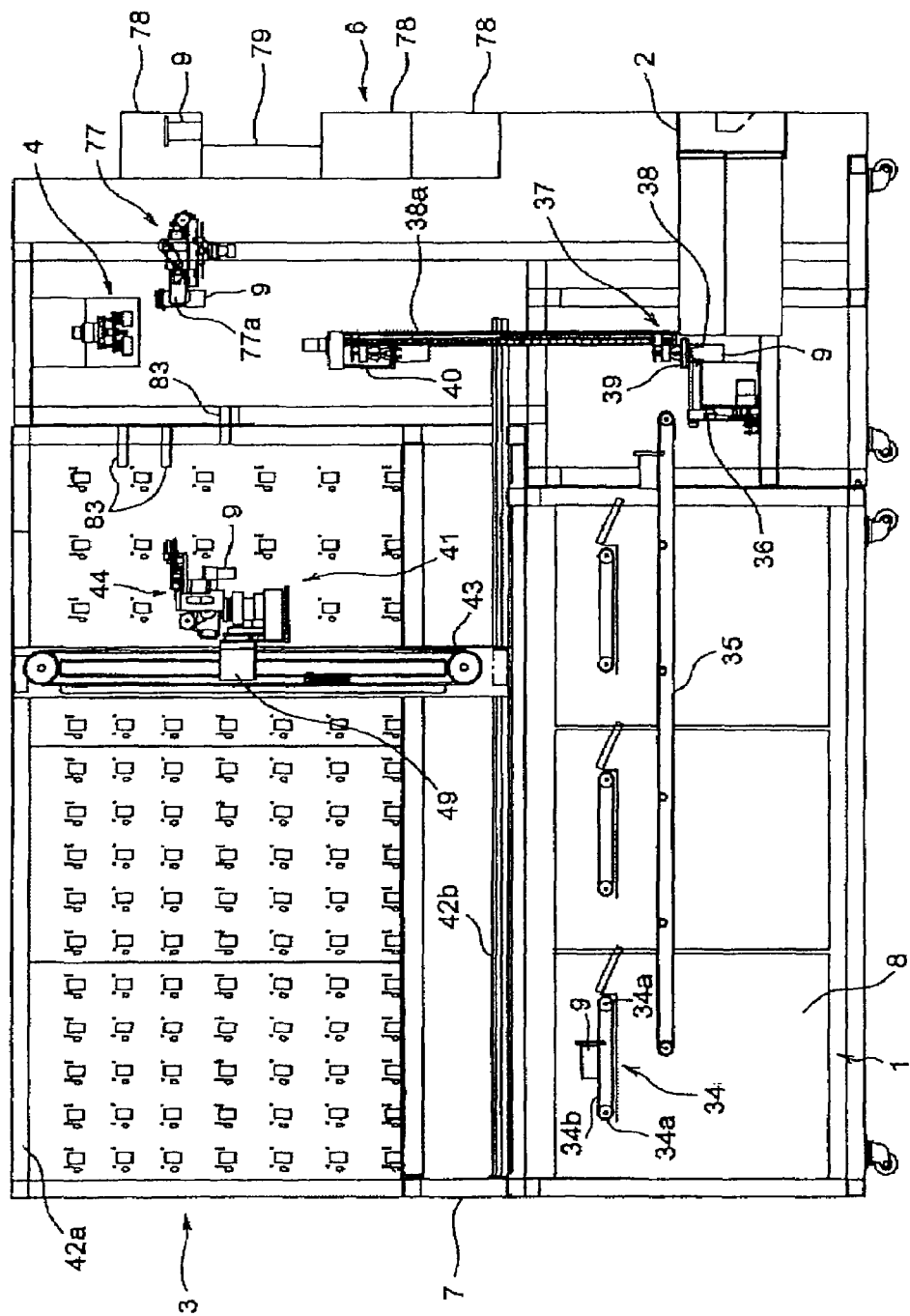
FIG. 3 is a front sectional view schematically showing the internal mechanism of FIG. 1.
Figure 4:
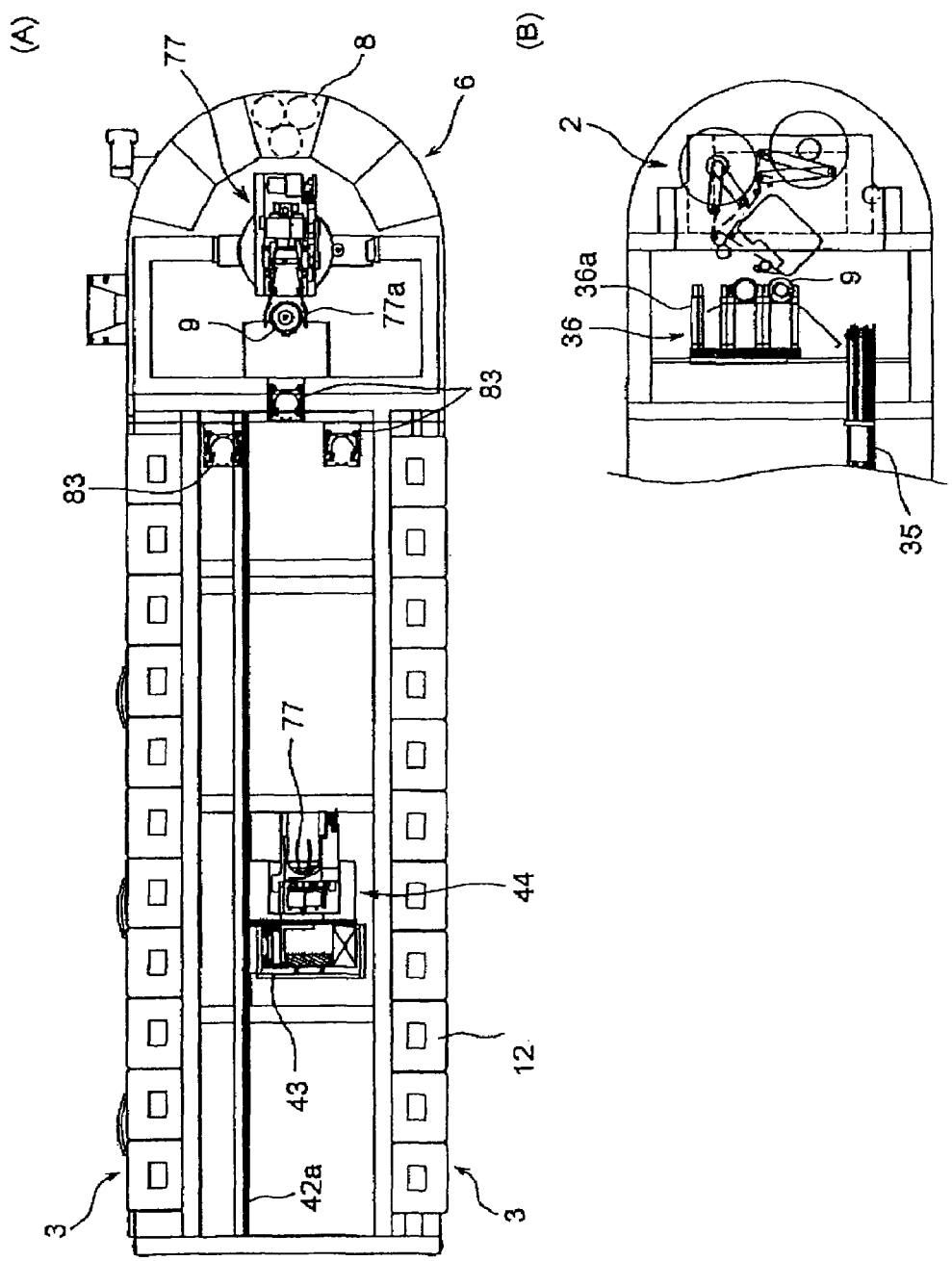
FIG. 4 includes portion (a) showing a plan sectional view schematically showing the internal mechanism of FIG. 1, and portion (b) showing a partial sectional view thereof.
Figure 5:
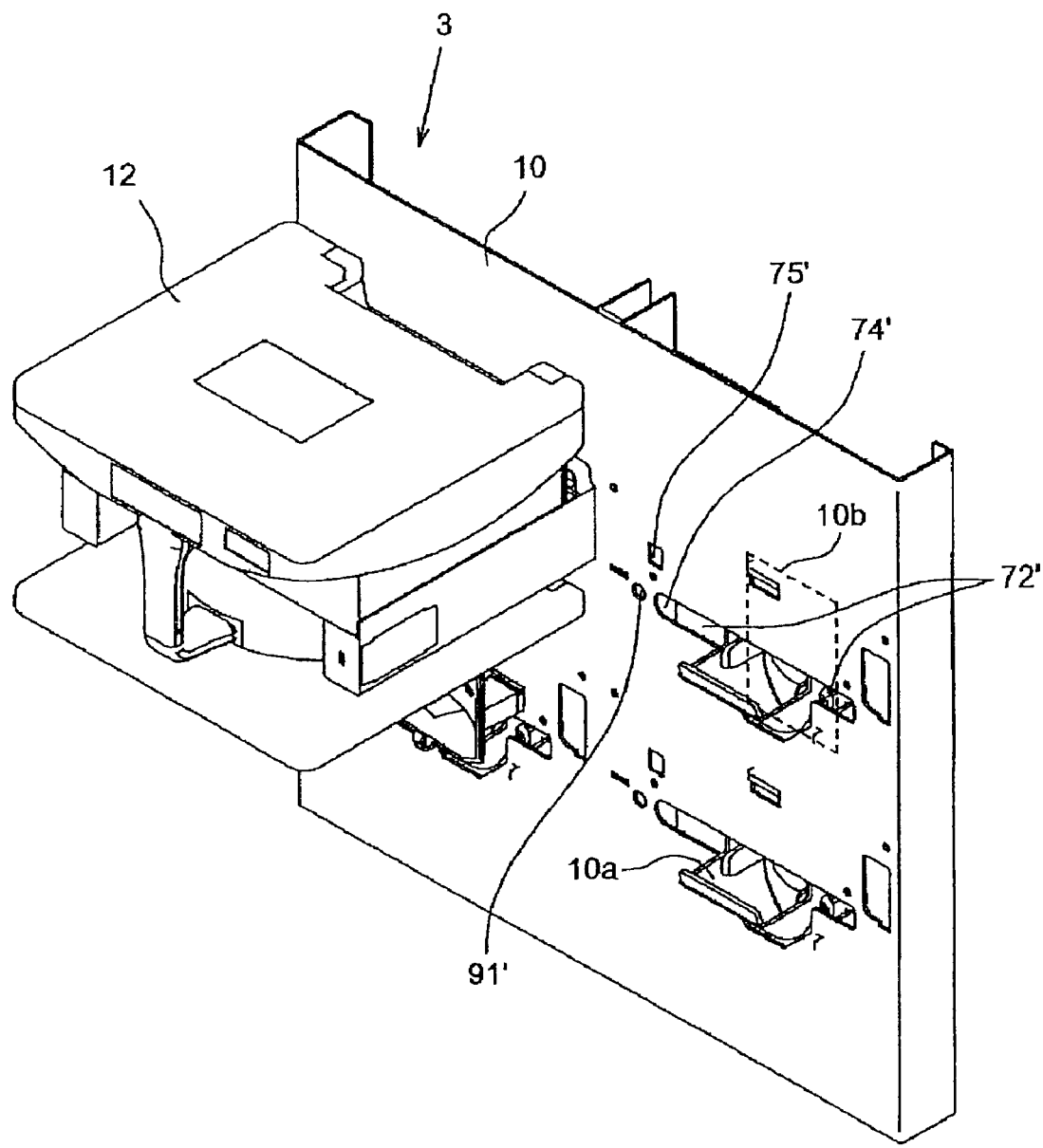
FIG. 5 is a perspective view of a part of the tablet feeding unit of FIG. 1.
Figure 6:
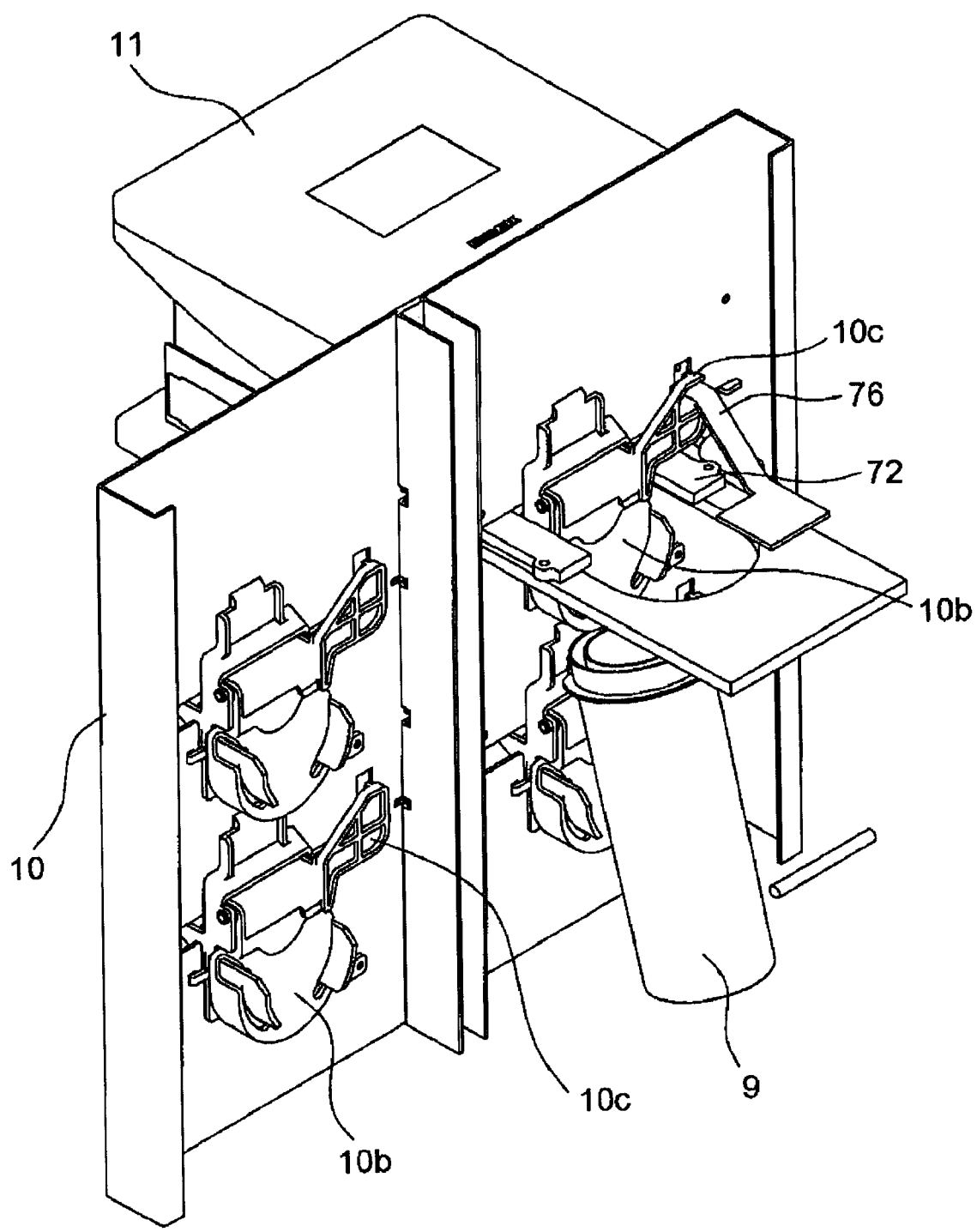
FIG. 6 is a rear perspective view of the tablet feeding unit of FIG. 5.
Figure 7:
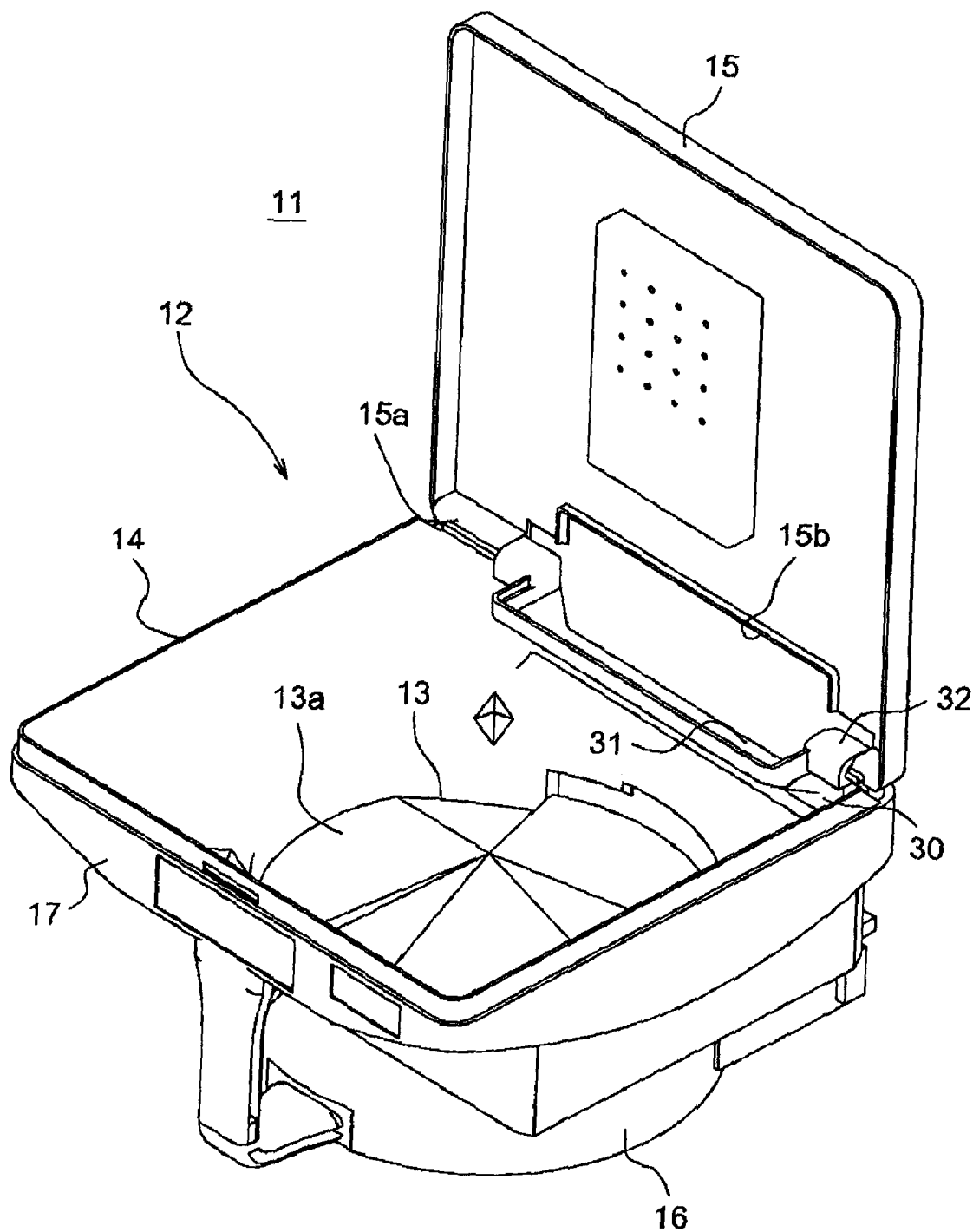
FIG. 7 is a perspective view of the tablet container of FIG. 5 with its cover member open.
Figure 8:
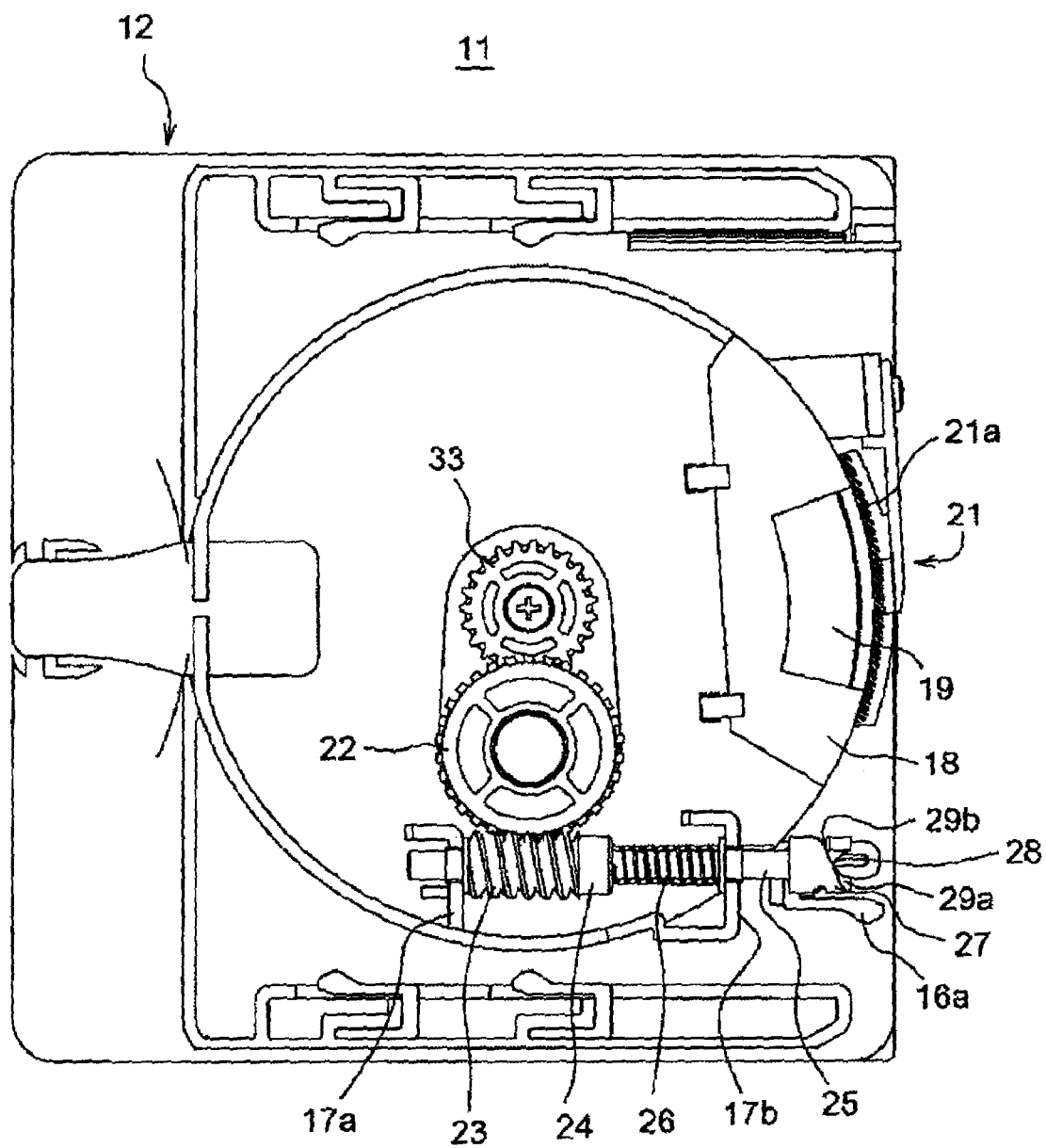
FIG. 8 is a bottom view of the tablet container shown in FIG. 7.
Figure 9:
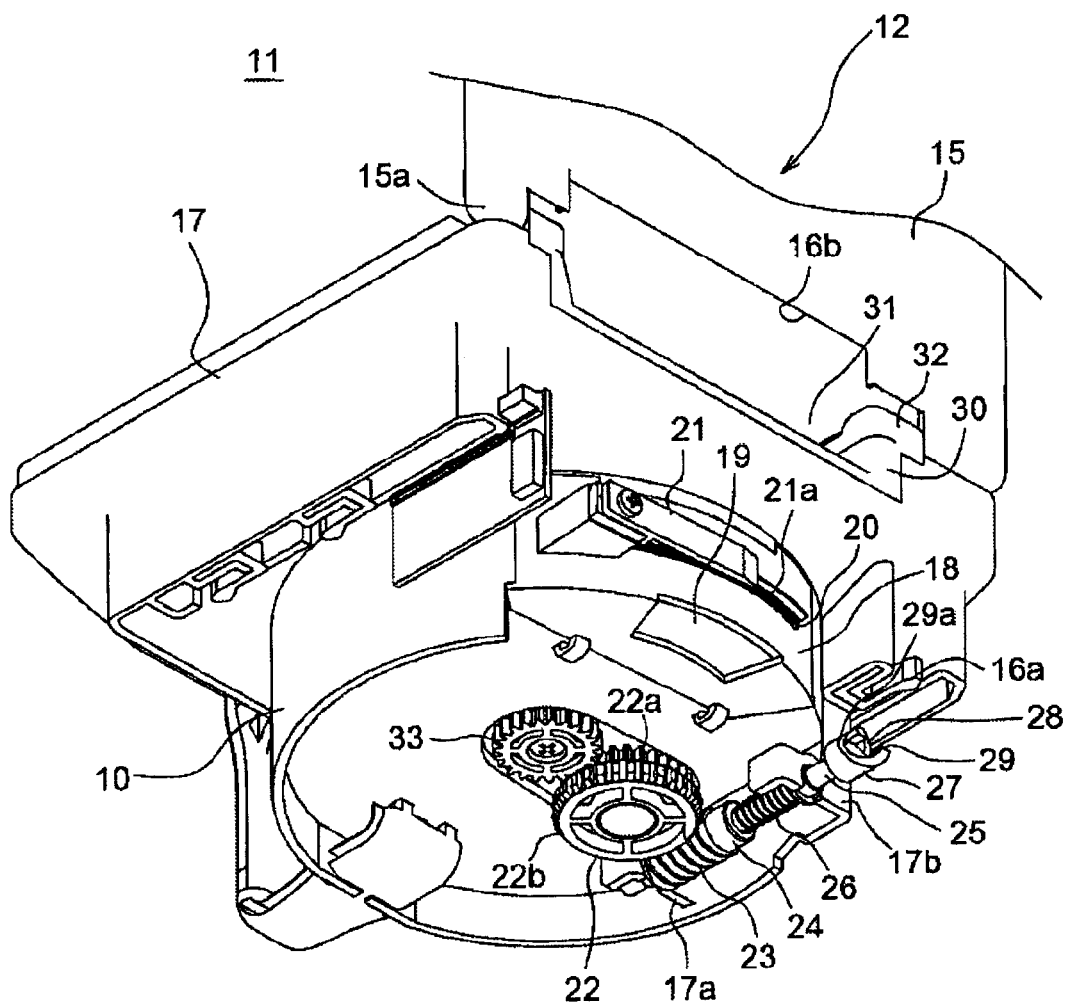
FIG. 9 is a perspective view, as seen from the bottom side, of the tablet container shown in FIG. 7.
Figure 10:
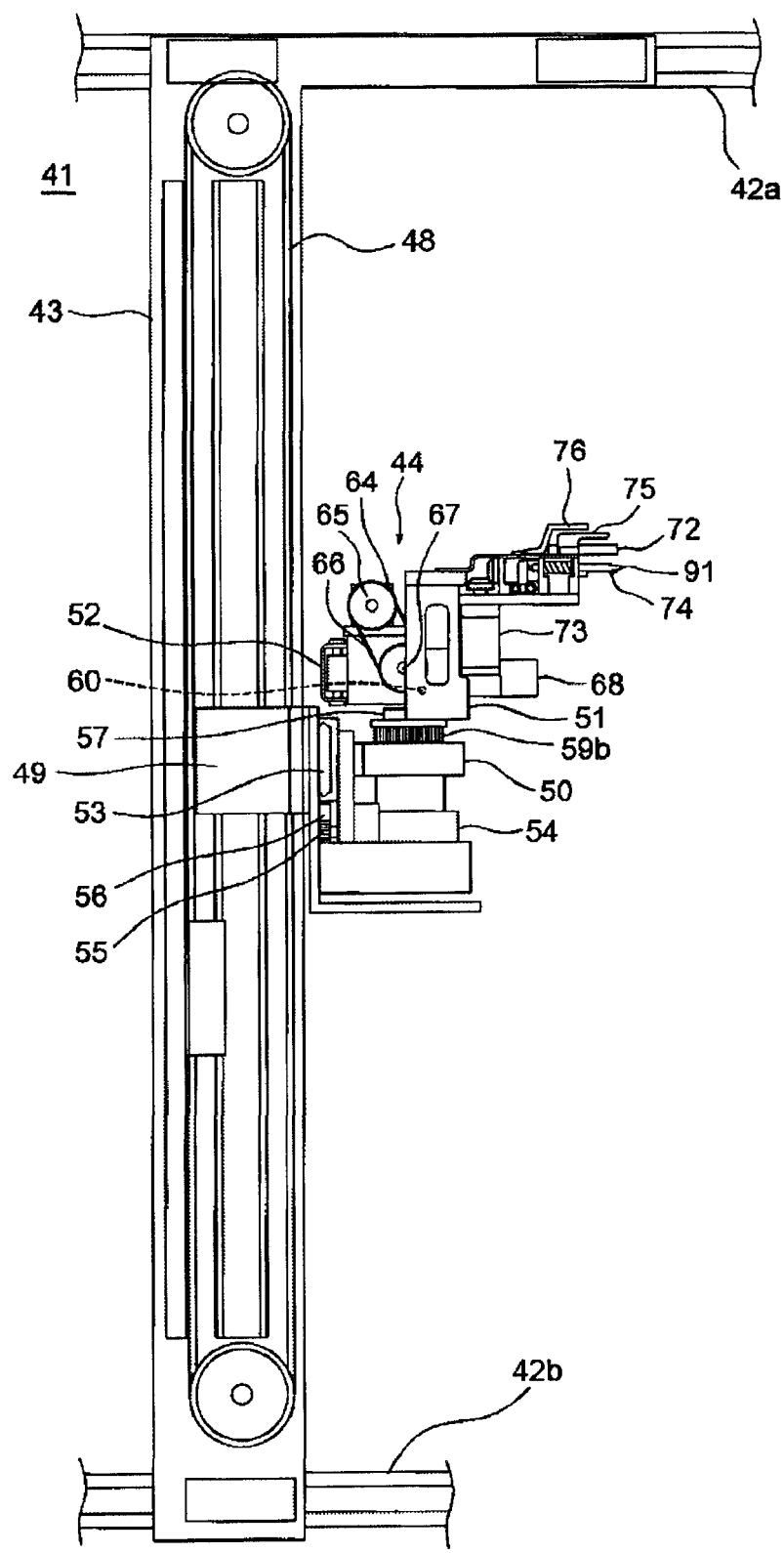
FIG. 10 is a front view of the third carrying member.
Figure 11:
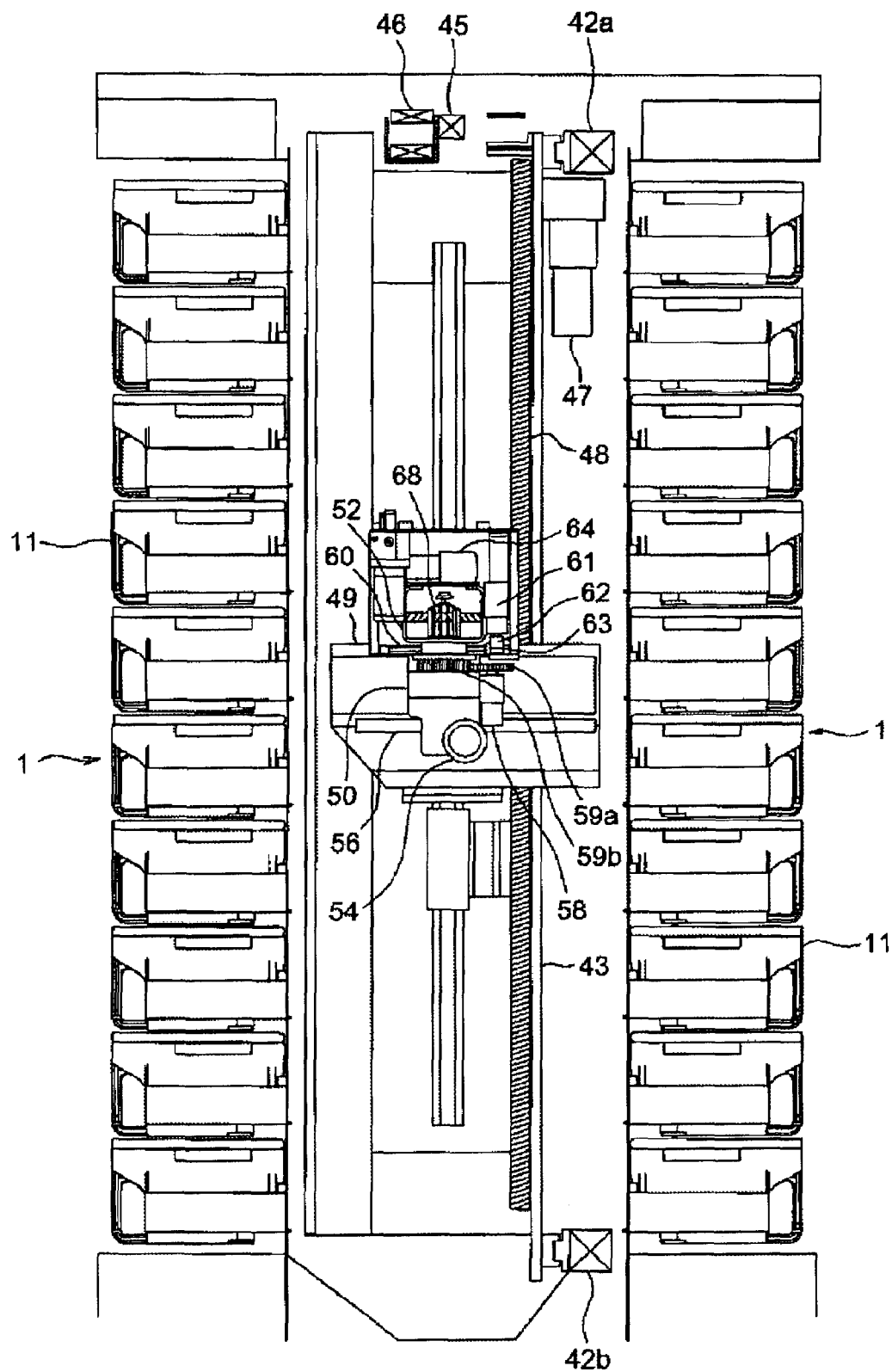
FIG. 11 is a right-hand side view of the third carrying member shown in FIG. 10.
Figure 12:
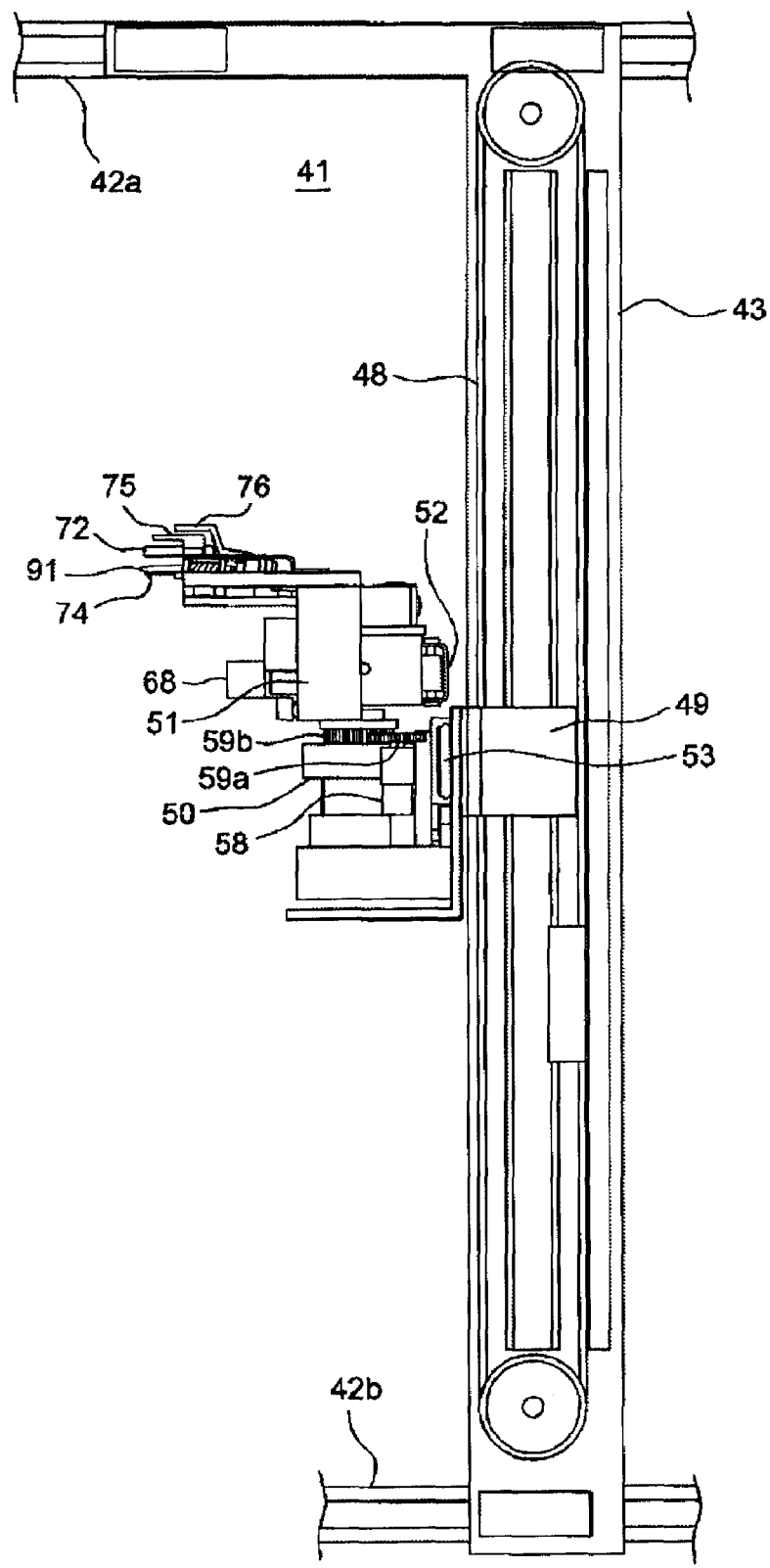
FIG. 12 is a rear view of the third carrying member shown in FIG. 10.
Figure 14:
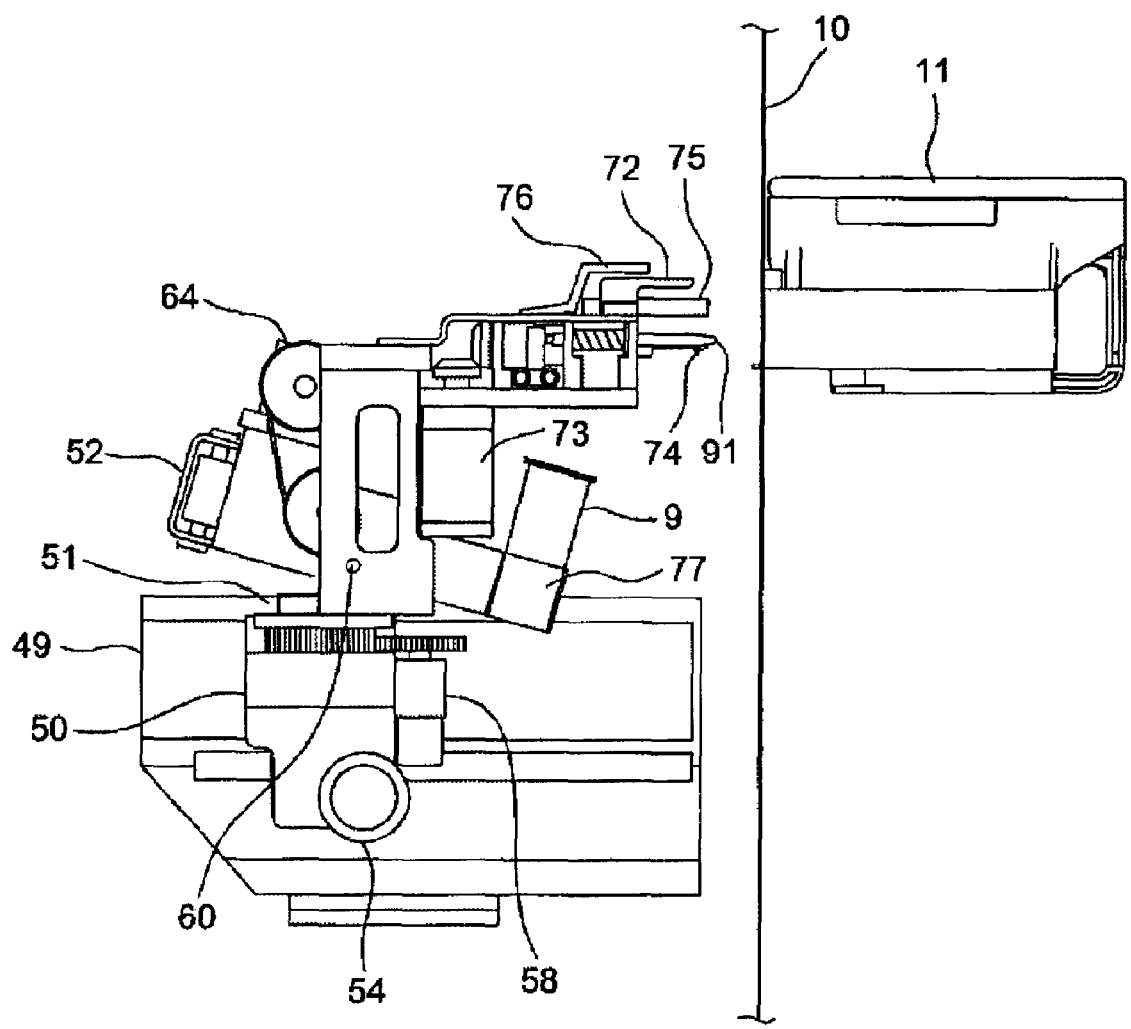
FIG. 14 is a side view showing how the arm unit approaches the tablet feeder.
Figure 15:
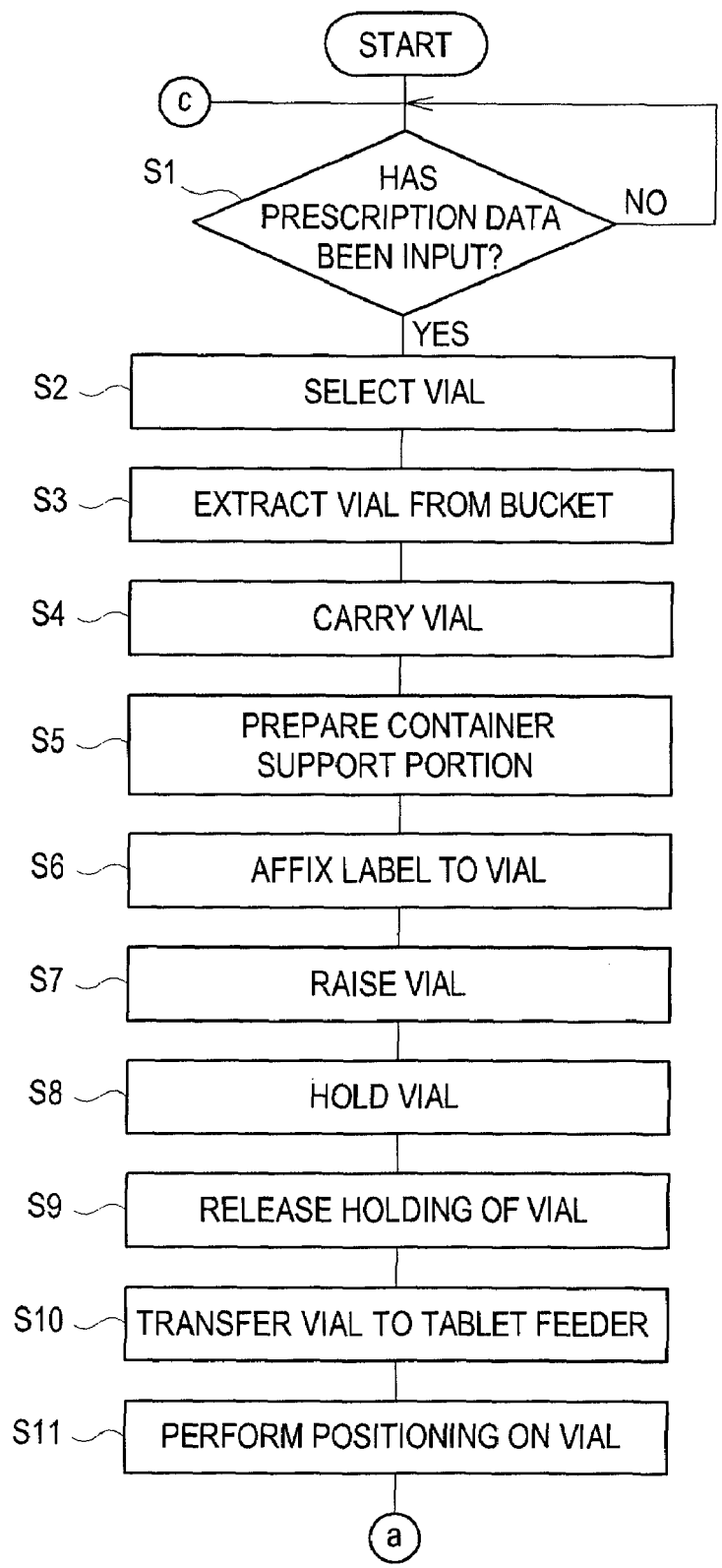
FIG. 15 is a flowchart illustrating the operation of the tablet filling device.
Figure 16:
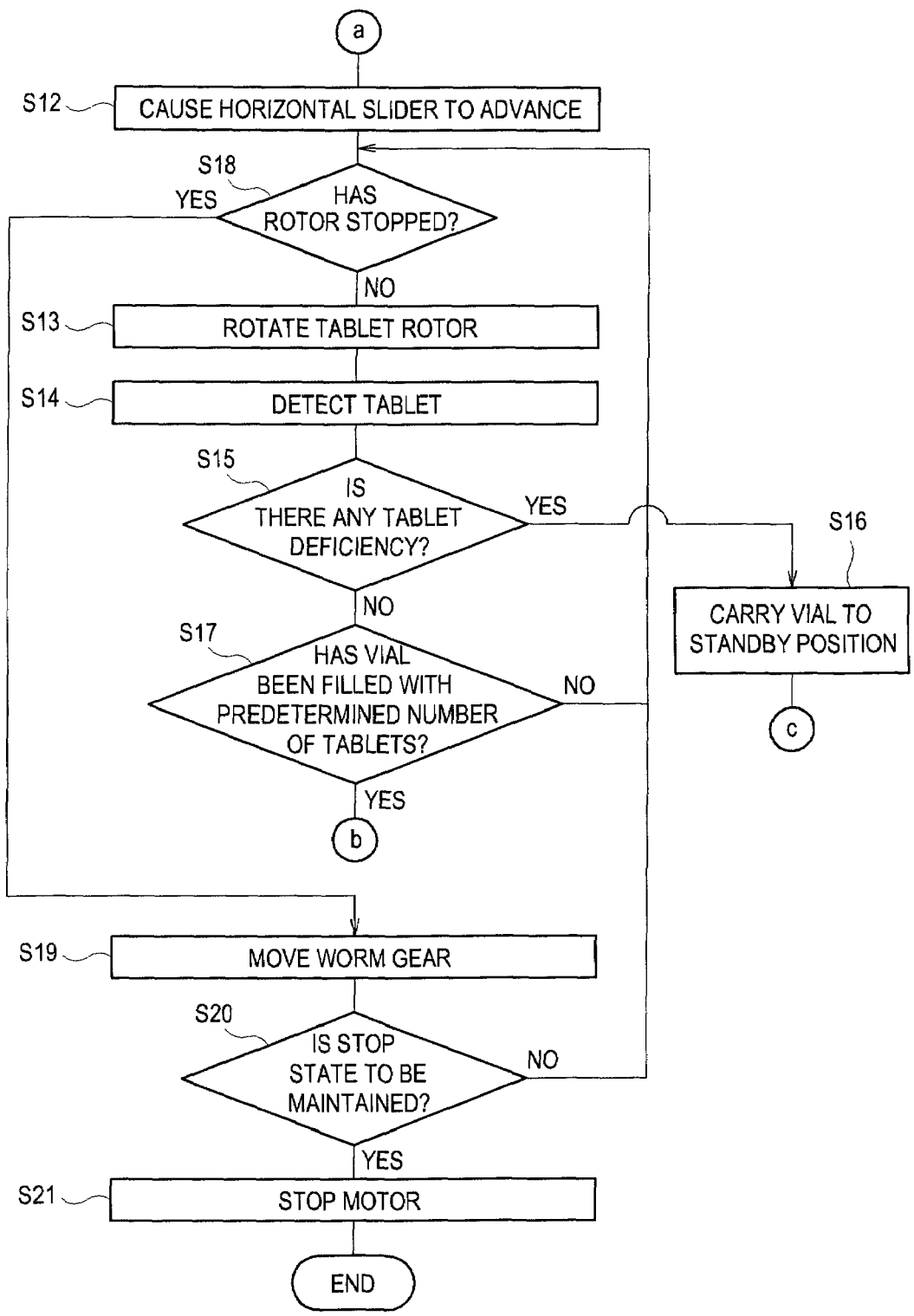
FIG. 16 is a flowchart illustrating the operation of the tablet filling device.
Figure 17:
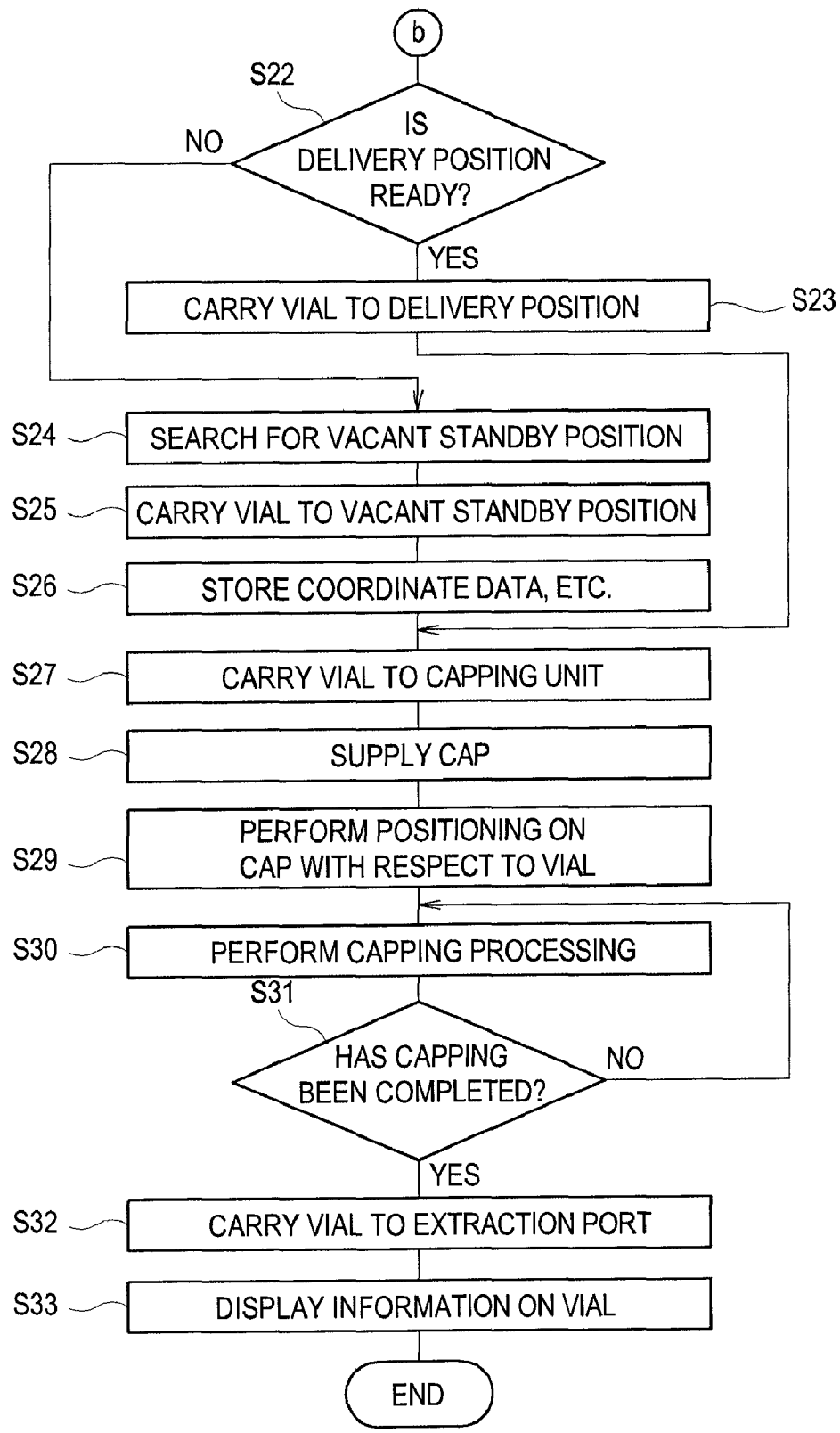
FIG. 17 is a flowchart illustrating the operation of the tablet filling device.
Figure 18:
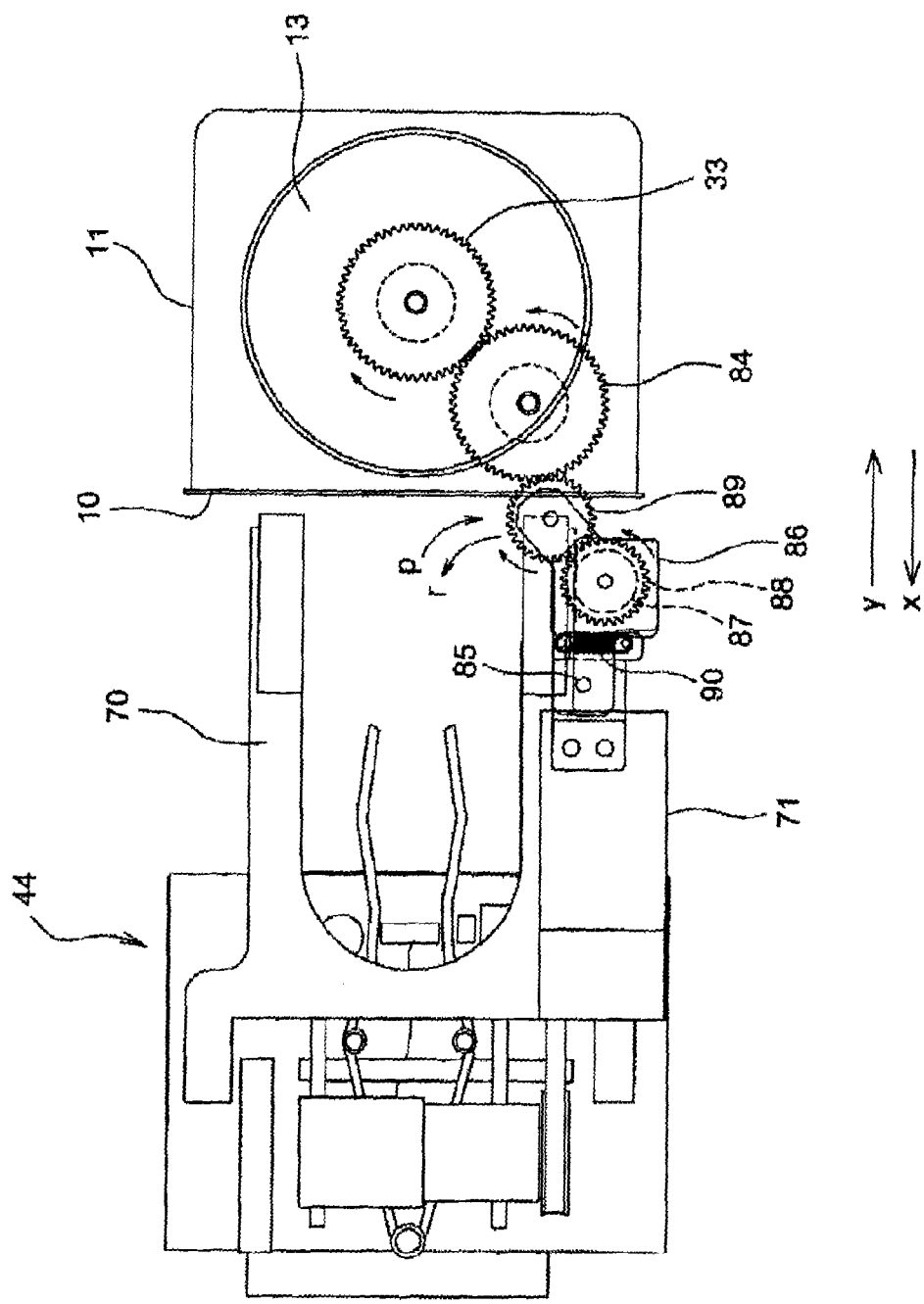
FIG. 18 is a schematic plan view of another embodiment of the tablet feeder and the arm unit.

DESCRIPTION OF REFERENCE SYMBOLS 1 tablet filling device
2 labeling unit
3 tablet feeding unit
4 capping unit
5 carrying member
6 extraction unit
7 device main body
8 buckets
9 vial
10 support panel
10a tablet outlet
10b cover
10c lever
11 tablet feeders (tablet supply member)
12 tablet cassette (tablet container)
13 rotor
13a conical surface
14 cassette main body
15 cover member
15a shaft portion
15b cutout portion
16 rotor accommodating portion
16a engagement portion
17 tablet accommodating portion
17a, 17b support wall
18 first replacement piece
19 tablet discharge port
20 slit
21 partition member
21a brush portion
22 intermediate gear
22a first gear
22b second gear (worm wheel)
23 worm
24 stopper
25 shaft portion
26 spring
27 locking/receiving portion
28 hole
29a guide groove
29b pin holding portion
30 second replacement piece
31 escape recess
32 bearing portion
33 rotor gear
34 first carrying member
34a roller
34b round belt
35 carrying belt conveyor
36 container support portion
36a support member
37 second carrying member
38 holding member
38a vertical rail
39 opening/closing frame member
40 stop portion
41 third carrying member
42a, 42b horizontal rail
43 vertical rail
44 arm unit
45 drive motor
46 drive belt
47 drive motor
48 drive belt
49 perpendicularly moving base
50 slide base
51 rotation base
52 inclining base (arm base)
53 slide rail
54 drive motor
55 pinion
56 rack
57 vertical shaft
58 drive motor
59a, 59b gear
60 horizontal shaft
61 drive motor
62 worm
63 worm wheel
64 drive motor
65 roller
66 belt
67 ball screw
68 arm
69 piezoelectric element
70 sensor arm
71 drive arm
72 count sensor
73 drive motor
74 drive shaft
74a lock pin
75 protrusion
76 pressing member
76a spring
77 fourth carrying member
77a arm
78 extraction port
79 display
80 control device
81 support plate
82 guide arms
83 container holding member
84 driven gear
85 support shaft
86 support arm
87 drive motor
88 transmission gear
89 drive gear
90 spring
91 detection rod
92 spring
93 sensor

The invention claimed is:

1. A tablet filling device, comprising:
a detachable tablet feeding unit in which a plurality of tablet feeders to discharge tablets one by one are arranged horizontally and vertically; and
an arm unit which carries an empty vial, fills the vial with tablets discharged from a tablet feeder of the tablet feeding unit, and carries the vial filled with the tablets,
wherein the arm unit comprises:
a perpendicularly moving base movable horizontally and vertically along a horizontal rail and a vertical rail, respectively, the rails being provided in directions in which the tablet feeders of the tablet feeding unit are arranged;
an arm base provided on the perpendicularly moving base being slidable in a horizontal direction perpendicular to the horizontal rail and horizontally rotatable; and
an arm provided on the arm base to hold the vial.

2. A tablet filling device according to claim 1, wherein the perpendicularly moving base is provided on the vertical rail moving along the horizontal rail.

3. A tablet filling device according to claim 1,
wherein the perpendicularly moving base includes a slide rail extending in a horizontal direction perpendicular to the horizontal rail, and
wherein the arm base is composed of a slide base slidable along the slide rail, and a rotation base rotatable around a rotation shaft provided on the slide base.

4. A tablet filling device according to claim 1, wherein the arm base inclines such that an opening of the vial held by the arm is oriented in a tablet discharging direction in which tablets are discharged from the tablet feeder.

5. A tablet filling device according to claim 1,
wherein each of the tablet feeders comprises:
a container to contain tablets;
a rotor to discharge the tablets one by one;
a rotor gear fixed to a shaft of the rotor;
a worm wheel in mesh with the rotor gear;
a worm in mesh with the worm wheel; and
a portion to be connected formed at an axial end of the worm, and
wherein the arm unit includes:
a drive shaft having at its forward end a connecting portion connected to the portion to be connected to transmit power; and
a drive motor to drive the drive shaft.

6. A tablet filling device according to claim 5,
wherein the portion to be connected comprises:
a hole axially extending from the axial end of the worm; and
a spiral groove extending axially around the hole, and
wherein the connecting portion of the arm unit comprises:
a shaft fitted into the hole of the portion to be connected; and
a protrusion extending perpendicularly from the shaft to be fitted into the groove of the portion to be connected.

7. A tablet filling device according to claim 5 or 6,
wherein the container of the tablet feeder includes a portion to be engaged, and
wherein an engagement portion to be engaged with the portion to be engaged of the tablet feeder is provided in a vicinity of the connecting portion of the drive shaft.

8. A tablet filling device according to claim 1,
wherein the tablet feeder comprises:
a container containing tablets, a rotor to discharge the tablets one by one; and
a transmission gear to transmit power to the rotor, and
wherein the arm unit includes:
a drive gear in mesh with the transmission gear; and
a drive motor to rotate the drive gear.

9. A tablet filling device according to claim 8, wherein the arm base is rotated, when the drive motor is overloaded, to temporarily separate the drive gear from the transmission gear, and then the drive gear is brought into mesh with the transmission gear again to impart an impact to the tablet feeder before re-starting the drive motor.

10. A tablet filling device according to claim 8, wherein the arm base is caused to slide, when the drive motor is overloaded, to temporarily separate the drive gear from the transmission gear, and then the drive gear is brought into mesh with the transmission gear again to impart an impact to the tablet feeder before re-starting the drive motor.

11. A tablet filling device according to claim 1, wherein the arm unit includes a counting means for counting tablets discharged from the tablet feeders.

12. A tablet filling device according to claim 11, wherein the counting means is arranged above and on either side of an opening of the vial being held by the arm.

13. A tablet filling device according to claim 1, wherein the arm unit includes a vibration imparting means for vibrating the arm.

14. A tablet filling device according to claim 13, wherein the vibration imparting means is a piezoelectric element.

15. A tablet filling device according to claim 14, wherein the piezoelectric element is oscillated by an applied voltage while the vial is held by the arm unit, thereby bringing the tablets filling the vial into a high density state with no clearances.

16. A tablet filling device according to claim 1, wherein a cover is provided at a discharge port of each tablet feeder through which tablets are discharged.

17. A tablet filling device according to claim 16, wherein a protrusion is provided on the arm base, and when the arm base slides to approach the tablet feeder, the protrusion presses the cover at the discharge port to open the cover.

* * * * *